United States Patent
Nalim et al.

(10) Patent No.: US 8,443,583 B2
(45) Date of Patent: May 21, 2013

(54) PILOT FUEL INJECTION FOR A WAVE ROTOR ENGINE

(75) Inventors: Razi Nalim, Indianapolis, IN (US); Pezhman Akbari, Indianapolis, IN (US)

(73) Assignee: Indiana University Research and Technology Corp., Indianapolis, IN (US)

(*) Notice: Subject to any disclaimer, the term of this patent is extended or adjusted under 35 U.S.C. 154(b) by 924 days.

(21) Appl. No.: 12/304,923

(22) PCT Filed: Jun. 14, 2007

(86) PCT No.: PCT/US2007/071234
§ 371 (c)(1),
(2), (4) Date: Jul. 22, 2009

(87) PCT Pub. No.: WO2008/070210
PCT Pub. Date: Jun. 12, 2008

(65) Prior Publication Data
US 2010/0018215 A1    Jan. 28, 2010

Related U.S. Application Data

(60) Provisional application No. 60/813,840, filed on Jun. 15, 2006.

(51) Int. Cl.
*F02C 3/02* (2006.01)
(52) U.S. Cl.
USPC ........... 60/39.45; 60/39.34; 60/39.38; 60/247
(58) Field of Classification Search
USPC .............. 60/247, 39.38, 39.76, 39.34, 39.35, 60/39.45, 39.78
See application file for complete search history.

(56) References Cited

U.S. PATENT DOCUMENTS

| | | | |
|---|---|---|---|
| 5,345,758 | A | 9/1994 | Bussing |
| 5,749,219 | A | 5/1998 | DuBell |
| 5,894,719 | A | 4/1999 | Nalim et al. |
| 5,916,125 | A | 6/1999 | Snyder |
| 6,449,939 | B1 | 9/2002 | Snyder |
| 6,460,342 | B1 | 10/2002 | Nalim |
| 6,526,936 | B2 | 3/2003 | Nalim |
| 6,845,620 | B2 | 1/2005 | Nalim |
| 7,055,308 | B2 | 6/2006 | Pinard et al. |

(Continued)

FOREIGN PATENT DOCUMENTS

| | | |
|---|---|---|
| WO | 0068566 A2 | 11/2000 |
| WO | 0204794 A2 | 1/2002 |
| WO | 03023203 A2 | 3/2003 |
| WO | 2006083320 A2 | 8/2006 |

OTHER PUBLICATIONS

Bussing, T.R.A., "A Rotary Value Multiple Pulse Detonation Engines," AIAA Paper 95-2577 1995.

(Continued)

*Primary Examiner* — William H Rodriguez
(74) *Attorney, Agent, or Firm* — Maginot, Moore & Back, LLP

(57) ABSTRACT

Apparatus and methods for combustion of fuel. Some embodiments of the inventions include a fuel nozzle which injects fuel into a combustion channel of a wave rotor combustor or a pulse detonation combustor In some embodiments the combustion process includes a backward-propagating detonation wave within a substantially closed channel which compresses discrete quantities of combustible and noncombustible mixture. Yet other embodiments include a precombustion chamber integrated into the wave rotor, the outlet stator or both.

18 Claims, 19 Drawing Sheets

U.S. PATENT DOCUMENTS

| | | | |
|---|---|---|---|
| 7,093,794 | B2 | 8/2006 | Leyva |
| 7,100,377 | B2 | 9/2006 | Kraft |
| 7,124,573 | B2 | 10/2006 | Venkataramani et al. |
| 7,137,243 | B2 | 11/2006 | Snyder |
| 7,555,891 | B2 | 7/2009 | Muller et al. |
| 2004/0154304 | A1 | 8/2004 | Snyder |
| 2005/0279077 | A1 | 12/2005 | Hall et al. |
| 2006/0016170 | A1 | 1/2006 | Henry |
| 2006/0042228 | A1 | 3/2006 | Venkataramani et al. |
| 2006/0096295 | A1 | 5/2006 | Kraft |

OTHER PUBLICATIONS

Nalim, M.R., and Jules, K., "Pulse Combustion and Wave Rotors for High-Speed Propulsion Engines" 1998, AIAA Paper 98-1614.

Fong, K.K., Nalim, M.R., "Gas Dynamic Limits and Optimization of Pulsed Detonation Static Thrust," 36th AIAA/ASME/SAE/ASEE Joint Propulsion Conference, Huntsville, AL Jul. 1-19, 2000, AIAA Paper 2000-3471.

Smith, C.F., Snyder, P.H., Emmerson, C.W., and Nalim, M.R., "Impact of the Constant Volume Combustor on a Supersonic Turbofan Engine," 38th AIAA/ASME/SAE/ASEE Joint Propulsion Conference, Indianapolis, IN, Jul. 7-10, 2002, AIAA Paper 2002-3916.

Snyder, P., Alparslan, B., and Nalim, M.R., "Gas Dynamic Analysis of the Constant Volume Combuster, a Novel Detonation Cycle," 38th AIAA/ASME/SAE/ASEE Joint Propulsion Conference, Indianapolis, IN, Jul. 7-10, 2002, AIAA Paper 2002-4069.

Paxson, D.E., "Optimal Area Profiles for Ideal Single Nozzle Air-Breathing Pulse Detonations Engines." [Also NASA TM 2003-212496], 2003, AIAA Paper 2003-4512.

Perkins, H.D., Paxson, D.E., Povinelli, L.A., Petters, D.P., Thomas, S.R., Fittje, J.E., and Dyer, R.S., "An Assessment of Pulse Detonation Engine Performance Estimation Methods Based on Experimental Results," 44th AIAA Joint Propulsion Conference, Tuscon, AZ [Also NASA TM 2003-212496] Jul. 10-13, 2005, AIAA Paper 2005-3831.

Akbari, P., Nalim, M., & Snyder, "Analysis of Flow Processes in Detonative Wave Rotors and Pulse Detonation Engines," 44th AIAA Aerospace Science Meeting, Reno, NV, Jan. 9-12, 2006, AIAA Paper 2006-1236.

Akbari, P., Nalim, M., & Snyder, P. (2006). Numerical Simulation and Design of a Combustion Wave Rotor for Deflagrative and Detonative Propagation. 42nd AIAAASMESAEASEE Joint Propulsion Conference Exhibit (pp. 1-20). American Institute of Aeronautics and Astronautics, Jul. 12, 2006, AIAA Paper 2006-5134.

Akbari, P., Alparslan, B., Kilchyk, V., and Nalim, R., "Numerical Analysis of Hydrogen-Fueled Wave Rotors for Gas Turbine Applications," First International Hydrogen Energy Congress, Istanbul, Turkey, Jul. 13-15, 2005.

Alparslan, B., "Pressure Gain Analysis of a Detonation Wave Rotor," AIAA Regional Student Conference, Cincinnati, OH, 2002.

Alparslan, B., "An Investigation of Detonation Wave Rotor Cycles for Gas Turbine Engine Performance Enhancement," M.S. Thesis, Mechanical Engineering Dept., Indiana University-Purdue University Indianapolis, Indianapolis, IN, 2002.

"Nalim, M.R., "Assessment of Combustion Modes for Internal Combustion Wave Rotors," ASME Journal of Engineering for Gas Turbines and Power, vol. 121, No. 2, 1999, pp. 265-271; [Also AIAA Paper 95-25801; NASA TM-107242] Apr. 1999".

"Nalim, M.R., and Paxson, D.E., "A Numerical Investigation of Premixed Combustion in Wave Rotors," Journal of Engineering for Gas Turbines and Power, vol. 119, No. 3, 1997, pp. 668-675; [Also ASME Paper 96-GT-116; NASA TM-107242] Jul. 1997".

Nalim, M.R., "Longitudinally Stratified Combustion in Wave Rotors," Journal of Propulsion and Power, vol. 16, No. 6, 2000, pp. 1060-1068 [Also AIAA Paper 97-3141; NASA TM-107513] Nov.-Dec. 2000.

Anonymous, "A Pressure-Wave Machine with Integrated Constant-Volume Combustion," NEFF Funding of Swiss Energy Research 1977-1997, Project No. 426, 1997, pp. 142-153, 1997.

Nalim, M.R., and Pekkan, K., "Internal Combustion Wave Rotors for Gas Turbine Engine Enhancement," Proceedings of the International Gas Turbine Congress 2003, Tokyo, Nov. 2-7, 2003, ASME Paper IGTC-2003-FR-303.

Nalim, M.R., and Pekkan, K., "A Review of Rotary Pressure-Gain Combustion Systems for Gas Turbine Applications," Proceedings of ASME Turbo Expo 2003, Atlanta, GA USA, Jun. 16-19, 2003, ASME Paper GT-2003-38349.

Snyder, P., Alparslan, B., and Nalim, M.R., "Wave Rotor Combustor Test Rig Preliminary Design," 2004 ASME International Mechanical Engineering Congress, Anaheim, CA USA, Nov. 13-19, 2004, IMECE 2004-61795.

Dempsey, E., Müller, N, Akbari, P., Nalim, R., "Optimum Applications of Four-Port Wave Rotors for Gas Turbines Enhancement" 2005, ISABE-2005-1214.

$$\frac{\Delta s_{2\text{-}3}}{\Delta s_{2\text{-}3_b}} = \left[\int_2^3 c_v \frac{dT}{T} - R \ln \ln \frac{v_3}{v_2}\right] \bigg/ \left[\int_2^{3_b} c_p \frac{dT}{T} + R \ln \frac{P_{3_b}}{P_2}\right] \approx \left[\int_2^3 c_v \frac{dT}{T}\right] \bigg/ \left[\int_2^{3_b} c_p \frac{dT}{T}\right] \approx 0.75$$

PILOT FUEL INJECTION FOR A WAVE ROTOR ENGINE

CROSS-REFERENCE TO RELATED APPLICATIONS

This application claims priority to U.S. Provisional Patent Application Ser. No. 60/813,840, filed Jun. 15, 2006, the contents of which are incorporated herein by reference.

FIELD OF THE INVENTION

This invention relates generally to methods and apparatus for combustion, and in particular to combustion processes used with pulse detonation engines and wave rotors.

BACKGROUND OF THE INVENTION

The ability to produce pressure gain by a confined, intermittent combustion process (ideally constant-volume combustion) is a significant principle for improving gas turbine efficiencies. Indeed, the earliest working gas turbine around 1908, known as the Holzwarth engine, had valved and pulsating combustion chambers operated on a controlled explosive combustion process. However, ineffective utilization of wave action in the combustion chamber resulted in the non-uniform outflow and poor overall thermal efficiency. Holzwarth's design was surpassed by gas turbines that employed nearly constant-pressure heat addition, and newly developed compressor technology. Later, German scientists exploited pulsed combustion and wave action in the pulse-jet engine that powered the V-1 Buzz Bomb in World War II. Thereafter, theoretical and experimental efforts on various designs of pulse combustors for gas turbines have yielded limited gains, and integration with steady-flow machinery has been challenging. Recent efforts to develop pulse detonation engines (PDE) for propulsion applications has raised interest in all pressure-gain concepts, but the integration issue remains difficult for gas turbines.

Conventional steady-flow combustors are inherently subject to a pressure loss with addition of thermal energy, although ideally constant pressure. Cyclic constant-volume combustion can provide pressure gain, which boosts engine performance by effecting a more efficient thermodynamic cycle known as the Humphrey cycle. This is illustrated in FIG. 1, comparing schematic temperature-entropy (T-s) diagrams of a conventional Brayton engine ($1$-$2$-$3_b$-$4_b$) and the replacement Humphrey cycle ($1$-$2$-$3$-$4$) for fixed turbine inlet temperature and compressor discharge pressure. Pressure loss in conventional combustors ($p_{3b} < p_2$) is substituted with pressure to gain combustion process ($p_3 > p_2$), enabling greater turbine power output and higher cycle efficiency for the same combustion energy input.

Comparison of ideal entropy generation during combustion for the two cycles is revealing. Air-cycle calculation with constant specific heat ratio of 1.333 shows the ratio of entropy production for the Brayton and Humphrey cycles is 0.75, the inverse of the specific heat ratio. This 25% ideal reduction in entropy production represents substantial potential over years of effort to improve the efficiency of turbomachinery components, making the pressure-gain combustion concept a revolutionary improvement for modern gas turbines. Constant-volume combustion can be achieved by both deflagrative and detonative combustion modes. While deflagrative combustion in a closed system at roughly constant volume is commonly achieved in piston engines, the use of detonative combustion in an intermittently open-system to achieve constant-volume combustion has recently received significant attention. Specifically, pulse detonation engines (PDE) have been designed to create simple direct-thrust propulsion systems. In a PDE, detonable mixtures of fuel and air are admitted into open-end tube(s) and ignited, generating a detonation that provides a pulse of pressure and thrust. Following early work on single-tube PDE, recent work has focused on multiple-tube PDE designs that provide more continuous but still unsteady output. Among various possible configurations is the rotary-valved multiple-tube PDE proposed by Bussing. In this design, several stationary detonation chambers are arranged circularly and coupled to an air/fuel duct via a common rotary valve. Such arrangements allow some of the PDE chambers to be filled while detonation occurs in other PDE chambers.

Various embodiments of the inventions described herein provide novel and nonobvious improvements of the incorporation of pulsed combustions and wave action combustion into steady-flow machinery.

SUMMARY OF THE INVENTION

Various embodiments of the present invention pertain to advances in apparatus and methods for combustion. In some embodiments the advances integrate discrete, constant volume combustion into machinery otherwise operating with steady flow.

Some embodiments of the present invention include a combustor comprising a rotor defining a plurality of enclosed combustion channels. Some embodiments further include a first stator proximate to one end of the rotor, and a second stator proximate to the other end of the rotor.

In some other embodiments the first stator has a partitioned inlet and the second stator has at least one outlet. In yet other embodiments the partitioned inlet and the outlet are circumferentially arranged to support backward-propagating combustion within a channel of the rotor. Still other embodiments include a fuel nozzle for introducing fuel into at least one channel.

Another embodiment of the present invention includes a gas turbine engine, comprising a compressor, a first fuel nozzle for mixing fuel with compressed gas, and a combustor adapted and configured for receiving a discrete quantity of a combustible mixture. Some embodiments further include second fuel nozzle for injecting fuel into the combustor to form a fuel-rich region for subsequent ignition.

Another embodiment of the present invention includes a method for generating hot gas, comprising flowing a first discrete quantity of a combustible mixture into a combustion chamber. Some embodiments further include injecting fuel into the combustion chamber, and igniting the fuel. In yet other embodiments the fuel is injected proximate to the outlet of the combustion chamber, such that detonation of the fuel results in a backward-propagating shock wave that compresses other gases within the combustion chamber.

These and other aspects of various embodiments of the inventions will be disclosed in the drawings, description, and claims that follow.

DESCRIPTION OF THE DRAWINGS

FIG. 1$b$ shows an equation comparing entropy generated during portions of the cycles of FIG. 1$a$.

FIG. 17b is a partial schematic representation of an end view of the wave rotor of FIG. 17a.

DESCRIPTION OF THE EMBODIMENTS OF THE INVENTION

Figures 1A, 1B:
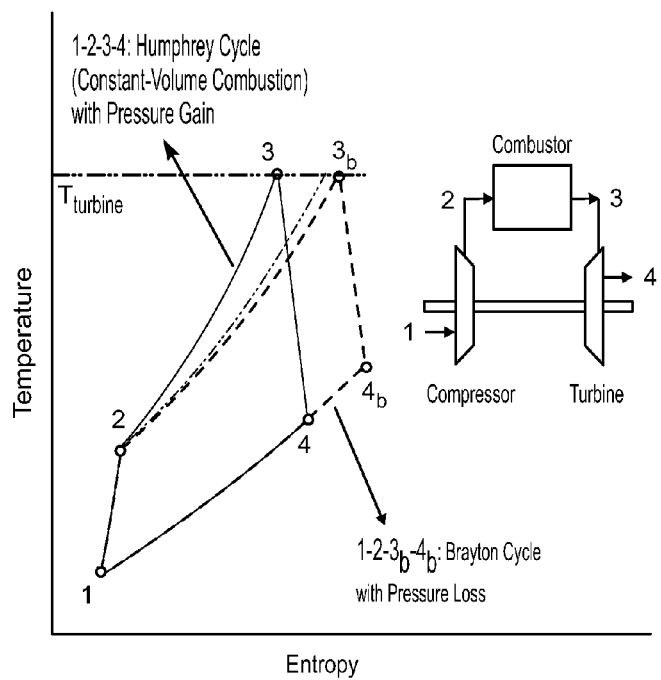
FIG. 1$a$ is a temperature-entropy (Ts) diagram for a Brayton cycle and a Humphrey cycle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

This application incorporates by reference the following documents: U.S. Pat. No. 5,894,719, published 20 Apr. 1999; U.S. Pat. No. 6,460,342, published 8 Oct. 2002; U.S. Pat. No. 6,526,936, published 4 Mar. 2003, U.S. Pat. No. 6,845,620, published 25 Jan. 2005; and U.S. Pat. No. 6,449,939, published 17 Sep. 2002.

The present invention relates to apparatus and methods of pulsed or wave action combustion, especially as applied within a steady flow device such as a gas turbine engine. In one embodiment of the present invention, there is a discrete quantity of combustible mixture and a discrete quantity of substantially unfueled air within a channel whose ends are temporarily closed. Combustion of the mixture provides a pressure wave which compresses the quantity of unfueled air.

The channel is temporarily opened at the end closest to where ignition occurred. A wave of relatively high pressure exits from the single opening of the channel. Subsequently, the other end of the channel is opened, and another discrete quantity of combustible mixture enters into the channel, although in some embodiments a quantity of fresh air is provided first. In some embodiments of the present invention, the initial detonation within the temporarily closed channel occurs in a relatively fuel-rich region of the channel proximate to a fuel nozzle that is in fluid communication with the uncombusted discrete quantity of mixture.

In yet other embodiments of the present invention, the above-described process further includes temporarily closing the exit end of the channel which the second discrete quantity of combustible mixture is entering the channel. The sudden closing of the channel exit converts some of the inertia of the second quantity into a hammer shock wave which travels from the now-closed end toward the open end. The subsequent closing of the open end (such that the channel is now closed on both ends) results in compression of the second quantity of combustible mixture and second quantity of fresh air. It is recognized that the term "fresh air" refers to a gas (including air) which has not been mixed with a fuel or other combustible substance prior to entry into the channel.

Yet other embodiments of the present invention pertain to a wave rotor combustor which includes a backward-propagating detonation cycle. A channel of the wave rotor includes a discrete quantity of combustible mixture and a discrete quantity of fresh air. A fuel nozzle injects a discrete quantity of fuel directly into the combustible mixture. This injection creates a region of a high fuel-fraction within the mixture which requires less ignition energy for detonation than other, non fuel-injected portions of the discrete quantity of combustible mixture.

Although what has been described thus far has been a single combustion channel, it is understood that the present invention includes those embodiments with multiple channels. Further, in some embodiments of the present invention, there is a multiple-channel combustor which rotates relative to a stationary channel inlet valve and a stationary channel outlet valve. In yet other embodiments, the combustor includes a single, static channel or a plurality of static channels, and one or more rotatable inlet valves which are in communication with the channel inlets, and one or more rotatable inlet valves which are in fluid communication with the channel outlet.

In addition, some of the discussion and drawings to follow relate to a wave rotor with a single inlet (or single partitioned inlet, and a single exhaust, the wave rotor assembly being adapted and configured for a single combustion event per rotation. However, it is understood that other embodiments relate to wave rotor assemblies which include multiple, separated inlets (or partitioned inlets) and multiple, separated exhausts, those wave rotor assemblies being adapted and configured for multiple combustion events per rotation. In some of these embodiments, the multiple inlets and equally spaced apart circumferentially, and the multiple exhausts are equally spaced apart circumferentially. Such equal spacing could provide more uniform loading of the components of the wave rotor assembly.

Figure 3:
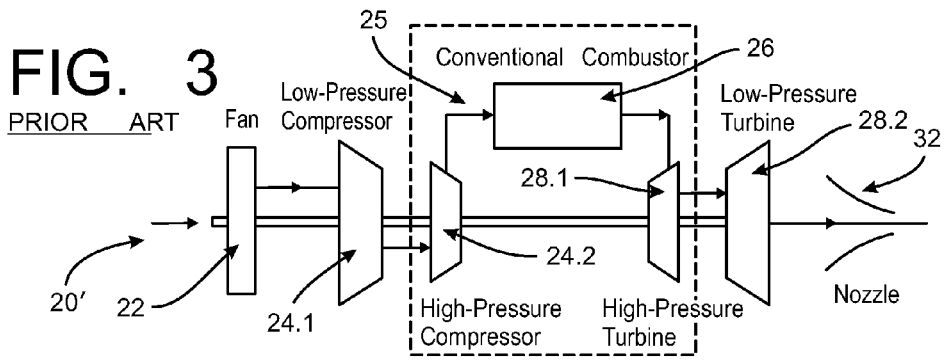
FIG. 3 is a schematic representation of a jet engine of the prior art.

Multiple-tube PDE's have been also considered for performance improvement of aircraft jet engines that include turbomachinery, e.g. turbofan engines (PDE-hybrid systems). For instance, placement of PDE's in the bypass duct of a turbofan engine to act as afterburners has been investigated. In proposals to replace high-pressure core of a turbine engine with a PDE, as schematically illustrated in FIG. 3, one goal is to provide higher turbine pressure from pressure gain combustion. While analytical and preliminary numerical simulations of PDE flows predict relatively high performance improvements for moderate supersonic flight speeds, detailed multi-dimensional modeling and experimental efforts indicate a complex interaction of highly unsteady PDE's and steady-flow turbines. Several practical issues including mechanical integration, thermal loading, fatigue, noise, and unsteady turbomachinery interactions should be addressed. Strong pressure pulses at the exit of PDE tubes subject turbine blades to highly unsteady flow and temperature unlike design conditions.

The wave rotor as an unsteady-flow machine could overcome some of these challenges of PDE's, particularly integration with turbomachinery flows. One embodiment of the present invention is a novel pressure-gain combustor based on wave rotor technology for gas turbine engines.

Figure 2:
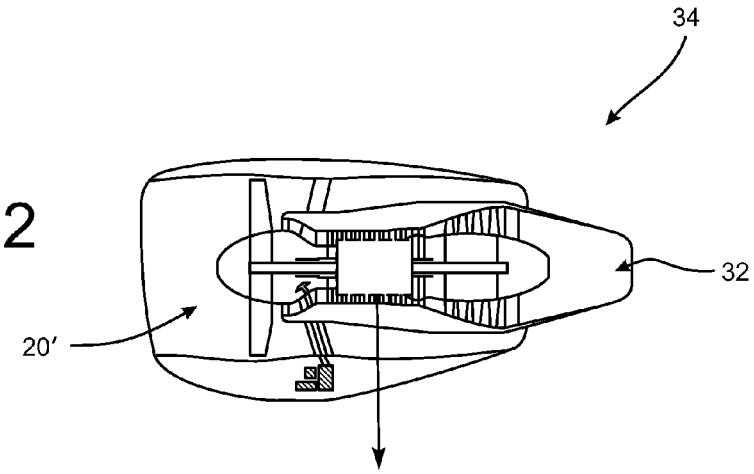
FIG. 2 is a cross-sectional schematic representation of a jet engine mounted within a nacelle.

Some embodiments of the present invention relate to aerospace propulsion systems, including aircraft and missile engines. FIGS. 2 and 3 are schematic representations of a gas turbine engine 20' configured as a jet engine. Engine 20' includes a fan 22, low pressure compressor 24.1, and high pressure compressor 24.2 which feed compressed air into a steady flow, substantially constant pressure combustor 26. A fuel nozzle 25 injects fuel into the compressed air so as to create a combustible mixture within combustor 26. Hot gases flowing out of combustor 26 are fed sequentially through a high pressure turbine 28.1, low pressure turbine 28.2, and ultimately are accelerated through a convergent nozzle 32. Prior art engine 20' is one representation of a two-spool jet engine. There are other configurations of gas turbine engines (including turbojets, single and multiple shaft turbo props, turbo shaft engines, auxiliary power units, ground power units, and turbopumps) too numerous to describe in detail. Various embodiments of the present invention are applicable to these different configurations of gas turbine engines. Engine 20' is housed within a nacelle 34, which couples engine 20' to a fuselage or wing.

Figure 4:
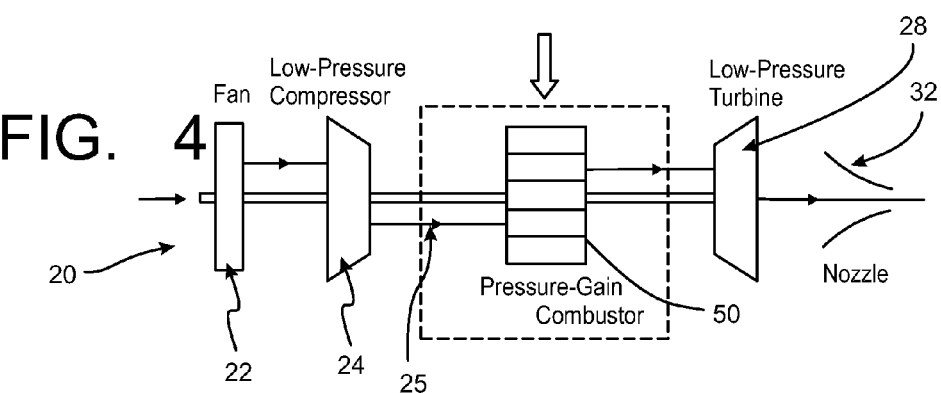
FIG. 4 is a schematic representation of a jet engine according to one embodiment of the present invention.

FIG. 4 is a schematic representation of a gas turbine engine according to one embodiment of the present invention. Engine 20 includes a fan 22 which receives air from an inlet, imparts energy into that air, and provides air at high pressure into the inlet of a compressor 24 as well as air at a higher velocity into a fan duct. Engine 20 further includes a compressor 24 (examples of which include axial and centrifugal configurations) and provides air under pressure into a chamber where it is mixed with fuel sprayed from a fuel nozzle 25 to form a combustible mixture.

This combustible mixture is provided into a wave rotor assembly 50, as will be later described. Wave rotor 50 combusts the mixture of fuel and air in a succession of substantially-constant volume detonations. The resultant combusted gas is provided to the inlet of a turbine 28 which extracts power to drive fan 22 and compressor 24. Further energy is extracted from the combusted mixture as it exits turbine 28 in the form of a high velocity jet of hot gas through nozzle 32. It is understood that the known term "compressor" refers to low pressure compressors and high pressure compressors, and likewise the term "turbine" refers to low pressure turbines and high pressure turbines.

Figure 5:
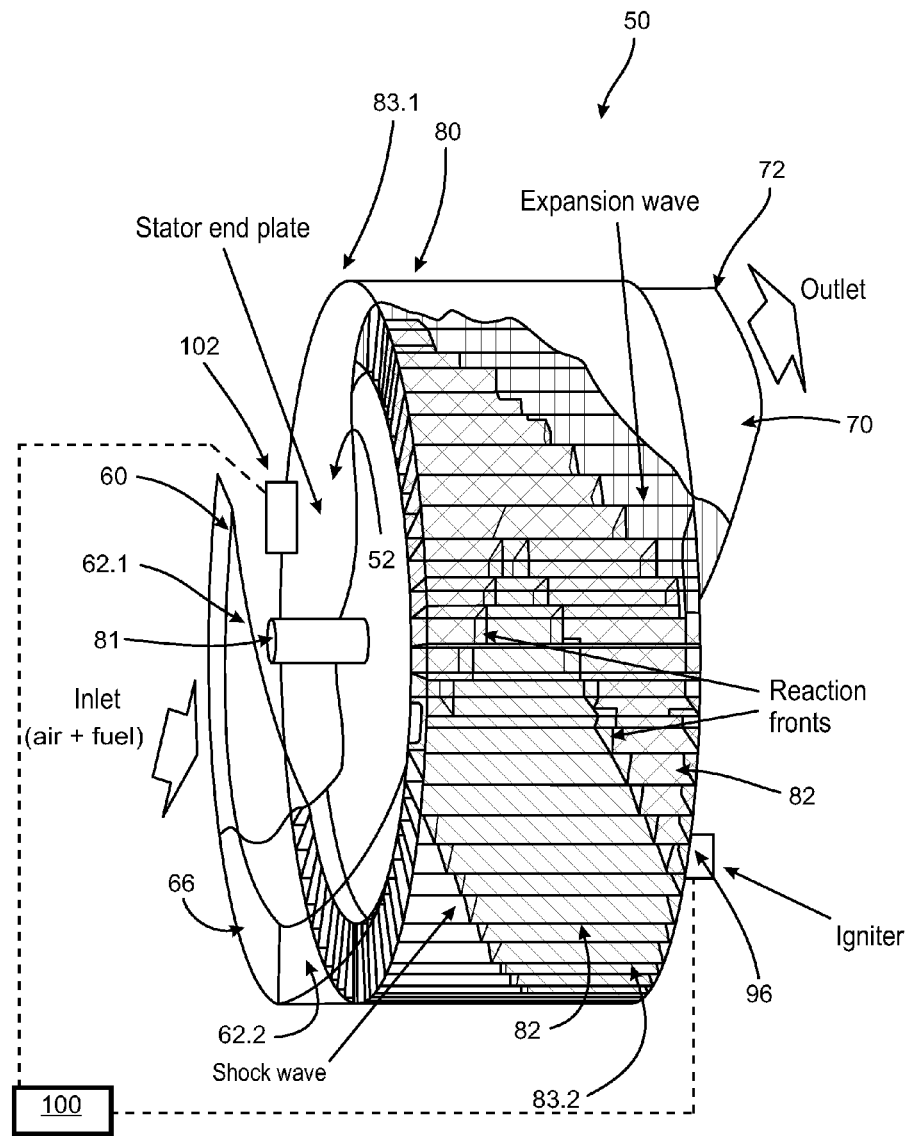
FIG. 5 is a perspective, schematic representation of a combustion wave rotor according to one embodiment of the present invention, with some hidden details being revealed.

Wave rotor assembly 50 is shown in more detail in FIG. 5. In one embodiment of the present invention, wave rotor assembly 50 includes a plurality of channels 82 arranged as a rotor 80 capable of rotation about axis 81 in rotational direction 52. Rotor 80 has a first end 83.1 and a second end 83.2.

Assembly 50 further includes a first stator 60 placed proximate to first end 83.1, and a second stator 70 placed proximate to end 83.2.

Figure 6:
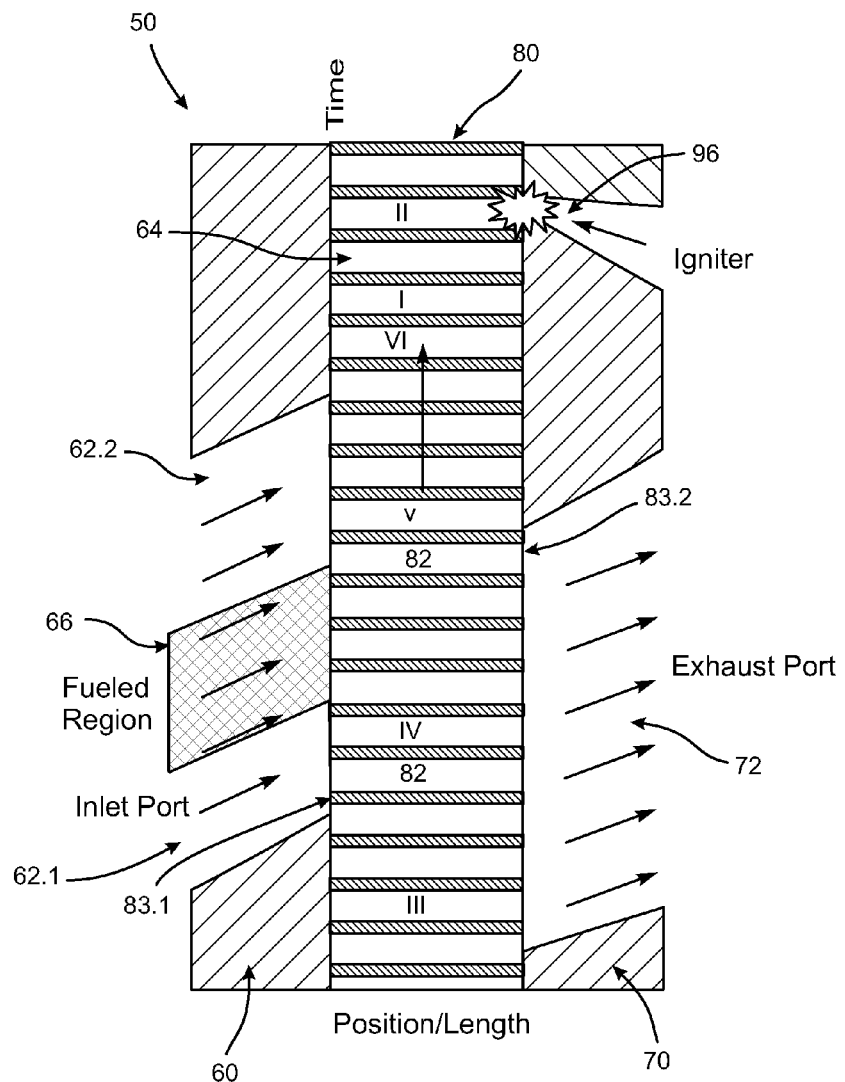
FIG. 6 is a schematic representation of a wave rotor in a developed (unwrapped) view according to one embodiment of the present invention.

Inlet stator assembly 60 is in fluid communication with both the compressed and unfueled air exiting from compressor 24, and it is separately in fluid communication with the mixture of fuel and air provided downstream of fuel nozzle 25. As best seen in FIGS. 5 and 6 (the latter being a developed or unwrapped representation of rotor assembly 50), the mixture of fuel and air is provided into an inlet 64 which is placed inbetween fresh air inlets 62.1 and 62.2. As a particular channel 82 of rotor 80 rotates past any of these three inlet ports, the inlet end 83.1 of a channel 82 is placed in fluid communication with the adjacent inlet port. Likewise, the exit or exhaust end or port 83.2 of a channel 82 is placed in fluid communication with exhaust port 72 as the particular channel 82 rotates across exhaust port 72.

In some embodiments, an igniter 96 is placed adjacent to the exhaust end 83.2 of the channel 82, and is further located between portions of inlet stator 60 and outlet stator 70 which close off or substantially obstruct flow into or out of a corresponding channel, resulting in channels proximate to the igniter being closed. In yet other embodiments, ignition is achieved through a glowplug, such as a glowplug used for starting a diesel engine.

The various embodiments of the present invention include either of two possible configurations of (a) forward-propagating detonation and (b) backward-propagating detonation can be defined in a detonative wave rotor. The term forward-propagating detonation implies propagation of the detonation wave starts from the inlet end of the combustion channel, where the igniter is located, toward the exit end. This case is similar to the detonation propagation in most PDE's. The backward-propagating detonation represents the configuration where a backward propagation of the detonation wave is generated by igniting the detonable mixture at the exit end of the channel using an igniter embedded in the exit end wall, as shown in FIG. 4. Although both configurations have potential for generating pressure gain across the wave rotor, in some embodiments the backward-propagating detonation case provides a more uniform exit flow profile. The forward-propagating detonation configuration still remains a good candidate as a pressure-gain device, and it resembles the flow field of a spinning PDE with or without an exit valve.

FIG. 6 schematically illustrates inlet, exhaust, and ignition port arrangements of the backward-propagating detonation configuration by tracking moving channels in a developed (unwrapped) view. Hence, the circumferential motion of the rotor channels is represented on paper in developed view by a vertical upward translatory motion, while the horizontal direction represents axial distance along the rotor channels. The green shading on the each side of the channels represent end walls that establish the portion of the cycle over which the inlet and outlet ports are closed. The flow enters and leaves the rotor channels when they pass the inlet and outlet ports, respectively. The opening and closing times of the inlet and exhaust ports are computed iteratively to insure the balance of mass flows between the ports and matched wave timings. The diagram also indicates a specific placement of fuel injection in the appropriate segments of the inlet port (red region) where the mixture of detonable gases enters the channels. Therefore, some sectors are left unfueled to provide only air to the channels. The detonation initiator is placed at the exit side end wall.

Figure 7:
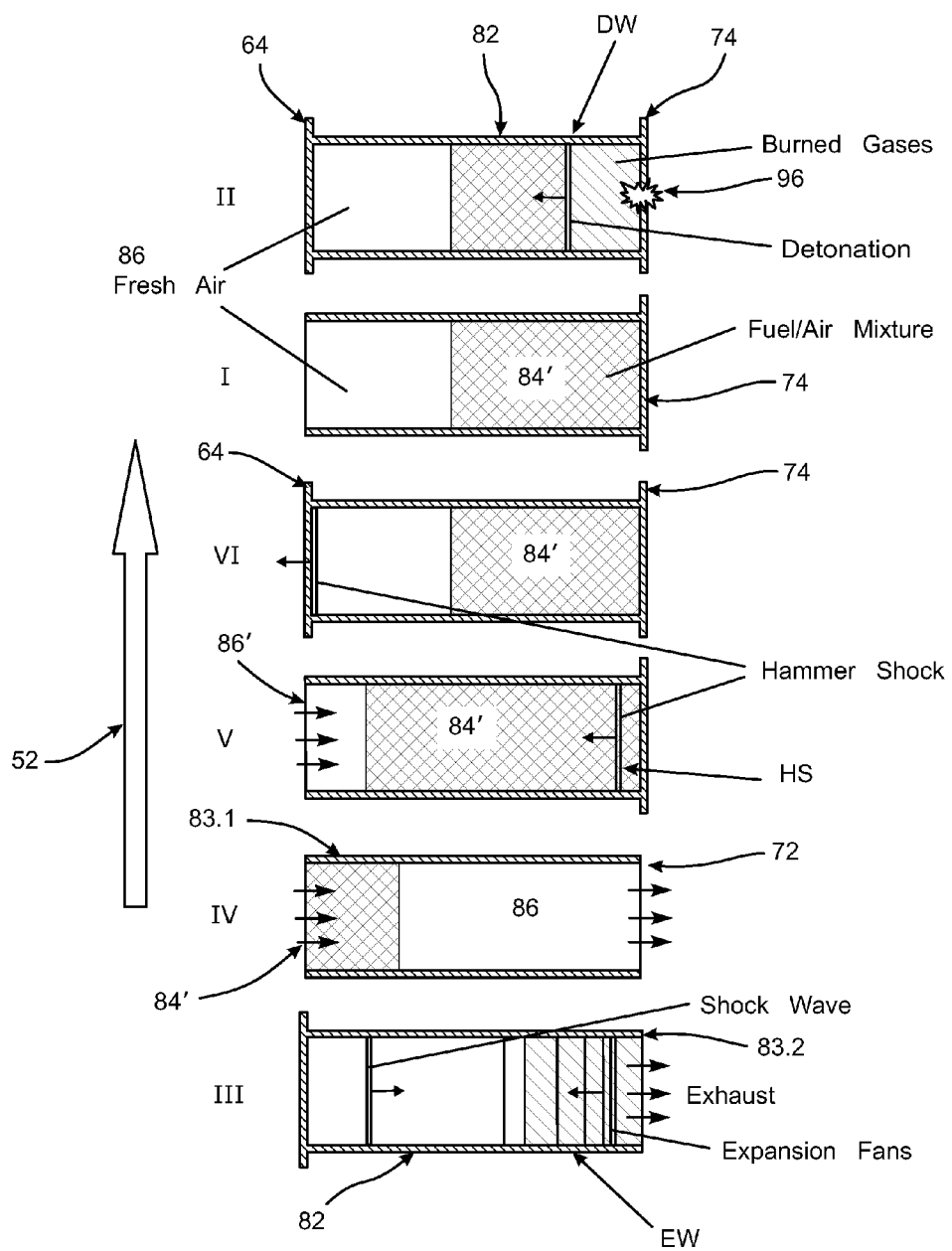
FIG. 7 is a schematic representation of the processes within the developed rotor of FIG. 5.

FIGS. 6 and 7 are schematic representations of a backward-propagating detonation cycle according to one embodiment of the present invention. FIG. 6 is an unwrapped schematic of rotor assembly 50, and FIG. 7 is a schematic representation of a particular channel 82 of rotor 80 during the detonation cycle. Roman numerals I-VI are used in discussing the various stages of the backward-propagating detonation cycle. It is understood that the same roman numerals are used in FIG. 6. In FIG. 6 these roman numerals appear in different channels 82, but are nonetheless are representative of the same corresponding combustion process.

Starting with state 1, channel 82 includes a discrete quantity 84 of combustible mixture and a discrete quantity 86 of fresh air. Ends 83.1 and 83.2 of channel 82 are substantially obstructed by the obstructing faces 64 and 74, respectively, of inlet stator 60 and inlet stator 70, respectively. It is appreciated that in those embodiments of the present invention in which the assembly of channels 82 is stationary, obstructing face 64 can be a rotating or movable flapper of an inlet valve, and obstructing face 74 can be a rotating or movable flapper of an outlet valve.

In state 11, a source of ignition (such as a spark igniter) has ignited the combustible mixture 84. A detonation wave DW moves within channel 82 toward the first end 83.1 of the channel. Since the first end of the channel is substantially obstructed, detonation wave DW compresses the remaining portion of combustible mixture 84 as well as the quantity 86 of fresh air.

Figures 11, 12, 13:
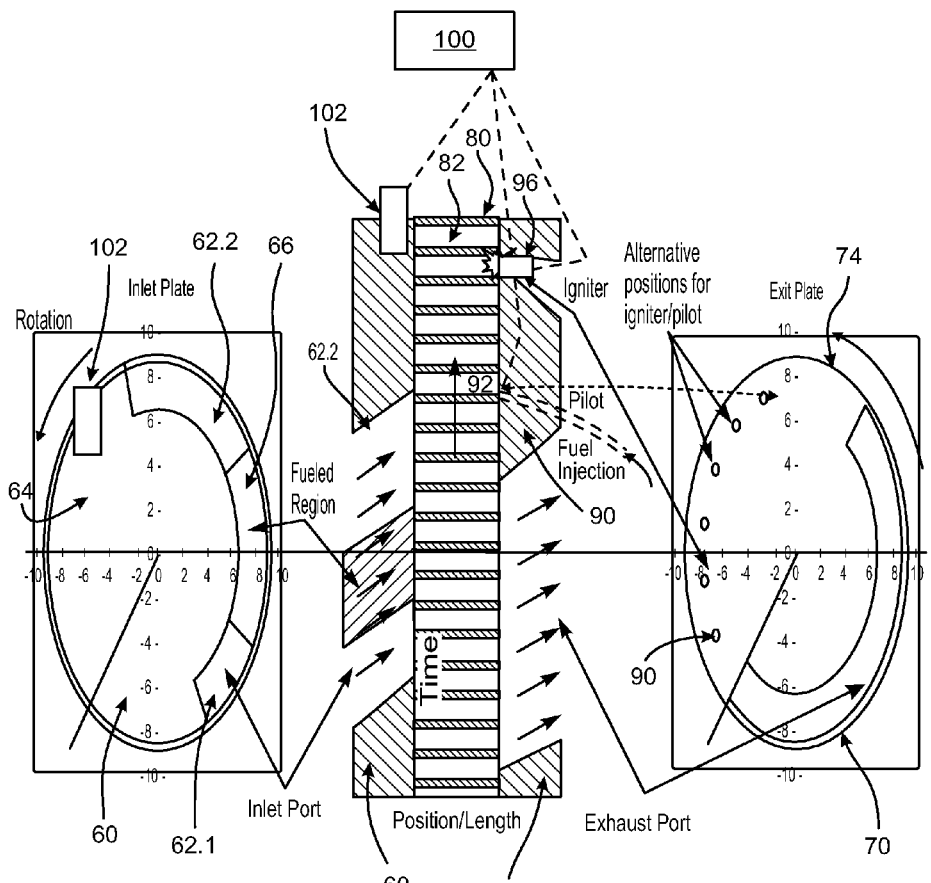
FIG. 11 is an end, elevational, schematic representation of the inlet side of a wave rotor apparatus according to one embodiment of the present invention.
FIG. 12 is a schematic representation of the wave rotor of FIG. 11 in a developed (unwrapped) view.
FIG. 13 is an end, elevational, schematic representation of the exhaust side of the wave rotor apparatus of FIG. 11.
Figures 14A, 14B, 14C, 14D:
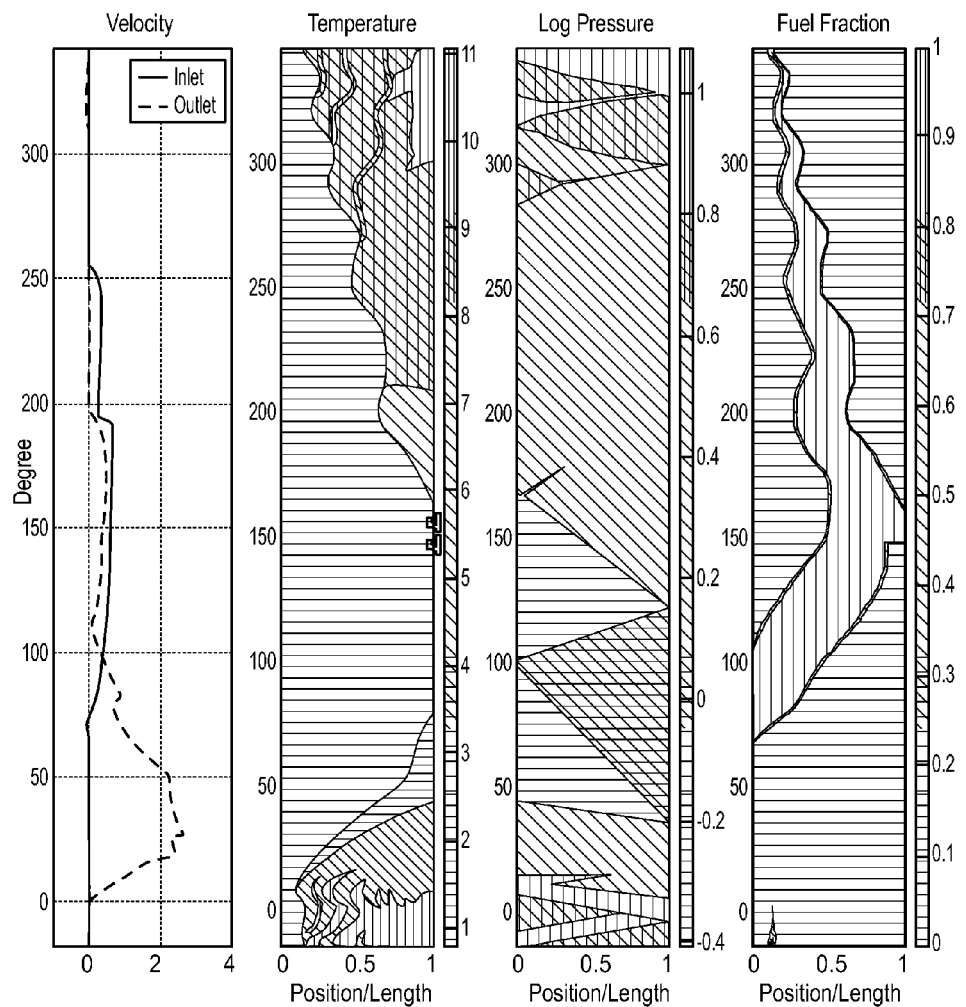
FIG. 14a is a wave diagram of velocity for backward-propagating combustion which includes pure deflagration, according to one embodiment of the present invention.
FIG. 14b is a wave diagram of temperature for backward-propagating combustion which includes pure deflagration, according to one embodiment of the present invention.
FIG. 14c is a wave diagram of pressure (logarithmic) for backward-propagating combustion which includes pure deflagration, according to one embodiment of the present invention.
FIG. 14d is a wave diagram of fuel fraction for backward-propagating combustion which includes pure deflagration, according to one embodiment of the present invention.
Figure 14E:
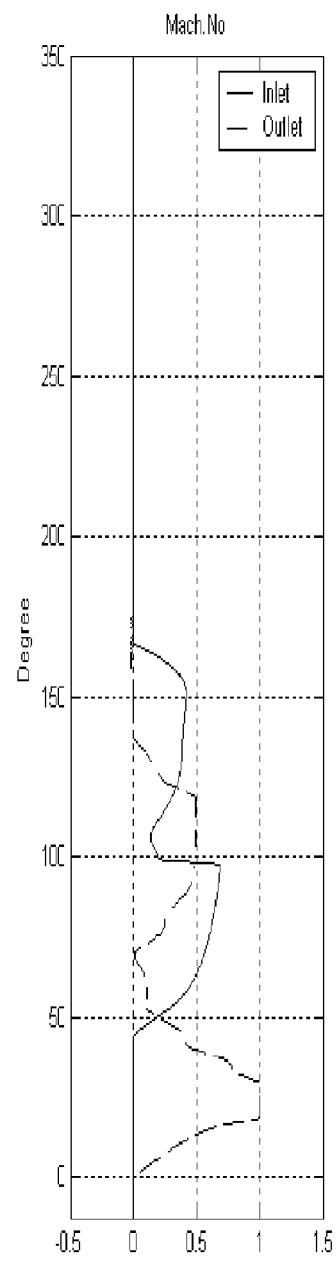
FIG. 14e is an inlet and exit flow profile of Mach number for backward-propagating combustion which includes pure deflagration, according to one embodiment of the present invention.
Figure 14F:
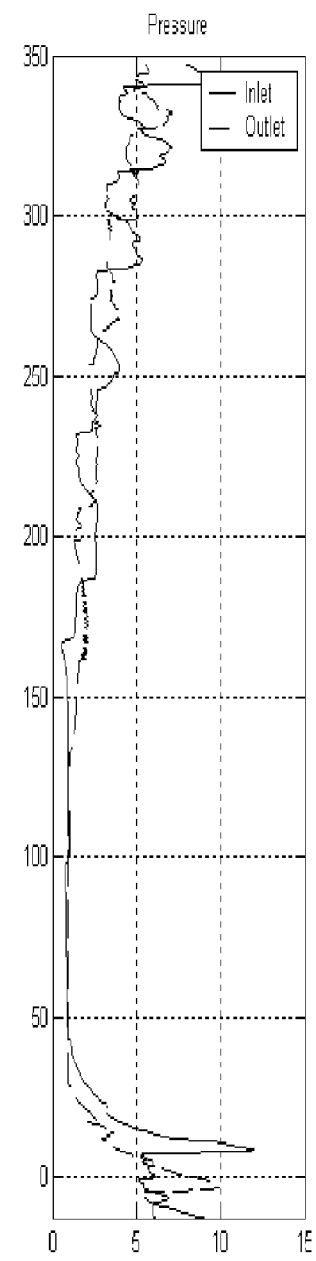
FIG. 14f is an inlet and exit flow profile of pressure for backward-propagating combustion which includes pure deflagration, according to one embodiment of the present invention.
Figure 14G:
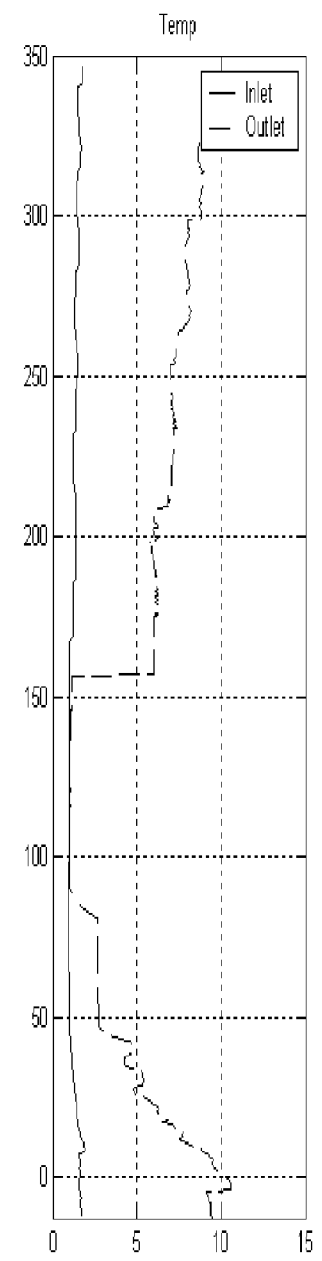
FIG. 14g is an inlet and exit flow profile of temperature for backward-propagating combustion which includes pure deflagration, according to one embodiment of the present invention.

In some embodiments of the present invention, a quantity of fuel 92 is injected during states I or II (refer also to FIG. 12). Ignition of this fuel can result in a torch within channel 82. In some embodiments this fuel 92 is the same as the fuel injected by fuel nozzle 32 to form combustible mixture 84. In yet other embodiments, the fuel 92 injected through nozzle 90 is a different type of fuel. For example, fuel 92 could be different than the main fuel being combusted, and take into account the particular environment of the wave rotor or PDE. This fuel 92 could include a fuel formulated to minimizing coking deposits on nozzle 90. In yet other embodiments, fuel 92 could be selected to achieve quick burning, such as hydrogen. In yet other embodiments, fuel 92 could be a hypergolic fuel whose use does not require a separate source of ignition. As one example, a hypergolic fuel such as H-70 could be used in combination with a catalytic substance (such as iridium) for ignition.

In some embodiments of the present invention, the injection of fuel 92 is synchronized with rotation of rotor 80, or in those applications including stationary channels, synchronized with a combustion event, such as the overpressure following ignition. In yet other embodiments, the operation of igniter 96 is synchronized with rotation of rotor 80 or a combustion event within a channel.

At state III, channel 82 has rotated past obstructing face 74, such that exhaust end 83.2 of channel 82 is in fluid communication with exhaust port 72. The high pressure combusted gases from quantity 84 and high pressure fresh air of quantity 82 subsequently expand into exhaust port 72, thereby increasing the total pressure within exhaust port 72.

At state IV, channel 82 has rotated past obstructing face 64 such that the inlet end 83.1 of channel 82 is in fluid communication with inlet port 62.1. As the expanding quantities 86 plus 84 continue to exit from channel 82, a new, second discrete quantity of combustible mixture 84' enters from fueled region 66 of inlet stator 60.

In state V, channel 82 has continued rotating such that the exhaust end 83.1 is suddenly closed off by obstructing face 74. The inlet end 83.1 of channel 82 is in fluid communication with fresh air port 62.2, and thereby places a second discrete quantity of fresh air 86' into channel 82. The sudden closing of exhaust end 83.1 of channel 82 results in a hammer shock HS propagating from the exhaust end of channel 82 toward the inlet end of the same channel.

Channel 82 continues to rotate to state VI, where the inlet end 83.1 of channel 82 is again obstructed by obstructing face 64 of inlet stator 60.

Corresponding to the rotor of FIG. 6, FIG. 7 shows a schematic of the processes intended within the backward-propagating detonation cycle, by tracking gas properties in a representative single moving channel over a complete cycle. The single channel is one among many other channels mounted on periphery of the rotating drum previously shown in FIG. 7. The cycle is described below.

With both ends closed after charging, the right half of the channel contains detonable mixture and other half contains air without fuel (I). Detonation is then initiated at the exit end of the channel (II) by exposing the detonable gases to hot gas received from a small ignition port. The released combustion energy generates pressure waves that merge into a single detonation wave that travels at very high speed into the mixture, raising the pressure significantly. The detonation wave serves both to achieve constant-volume combustion in the mixture and to shock-compress remaining air as it propagates to the left end of the channel. Meanwhile, opening the exhaust port creates an expansion wave as the burned gas leaves the channels (III). The exhaust gases exit at higher stagnation pressure than that of the inlet port, due to pressure-gain combustion. By opening the inlet port at the right moment when the arriving expansion wave has reduced the pressure adequately, the fresh air and detonable mixture sequentially enter the channel (IV). The filling process includes in some embodiments that the part of the channel adjacent to the exit-side wall contains detonable mixture, while some portion adjacent to the inlet wall contains only air. The mixture may be stratified according to the fuel flammability limits and emissions limits, with the overall fuel-air ratio determined by the allowed temperature rise permitted by the turbine. By closing the exhaust port while flow velocity is significant, the gas trapped in the channel is favorably compressed by a generated wave (hammer shock) (V). When the backward-propagating hammer shock wave arrives at the inlet wall (VI), the inlet port is closed and another operating cycle begins (I). The combination of these features results in relatively uniform inflow and outflow velocity, significant increase in pressure gain, and overall temperature ratio that is compatible with gas turbine engine requirements.

In this proposed cycle, the placement of mixture close to the outflow end has significant advanges: (i) high temperature gas is kept away from the inlet region, reducing the risk of premature ignition, (ii) residence time at high temperature is minimized, lowering the production of nitrogen oxides, (iii) backward propagation of the detonation wave and its reflection as a shock at the inlet side wall causes redistribution of pressure and energy, so as to minimize pressure non-uniformity in the outflow. The main challenge of providing ignitable mixture at the near-wall region is addressed below.

Figure 8:
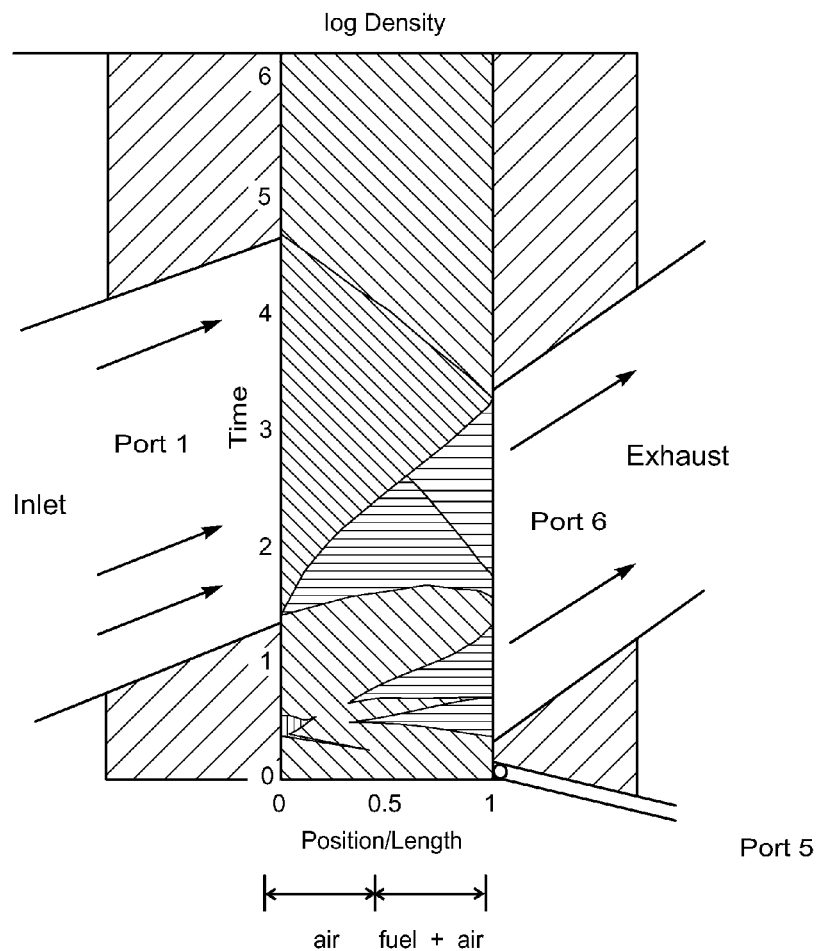
FIG. 8 is a representation of the log of gas density of the working fluid corresponding to the combustion processes of FIGS. 5 and 6, based on idealized simulation.
Figure 9A:
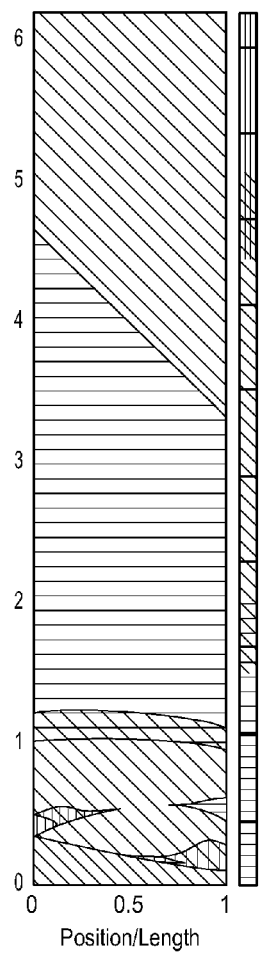
FIG. 9a is a non-dimensional wave diagram showing pressure (in logarithmic scale) for the combustion processes of FIGS. 5, 6, and 7.
Figure 9B:
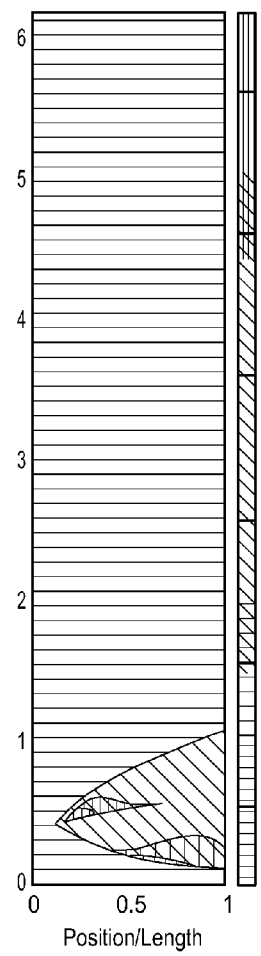
FIG. 9b is a non-dimensional wave diagram showing temperature for the combustion processes of FIGS. 5, 6, and 7.
Figure 9C:
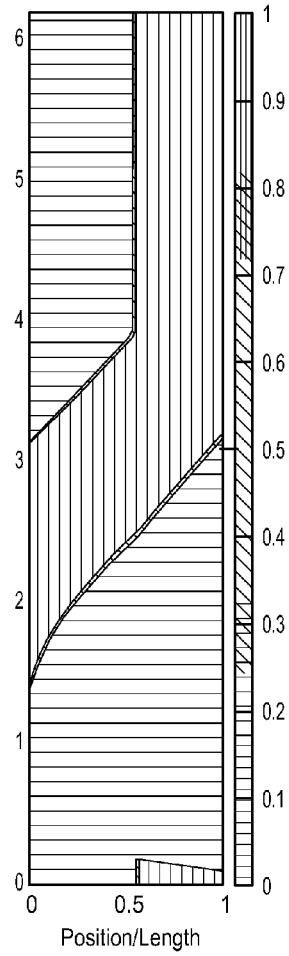
FIG. 9c is a non-dimensional wave diagram showing fuel fraction for the combustion processes of FIGS. 5, 6, and 7.
Figures 9D, 9E, 9F:
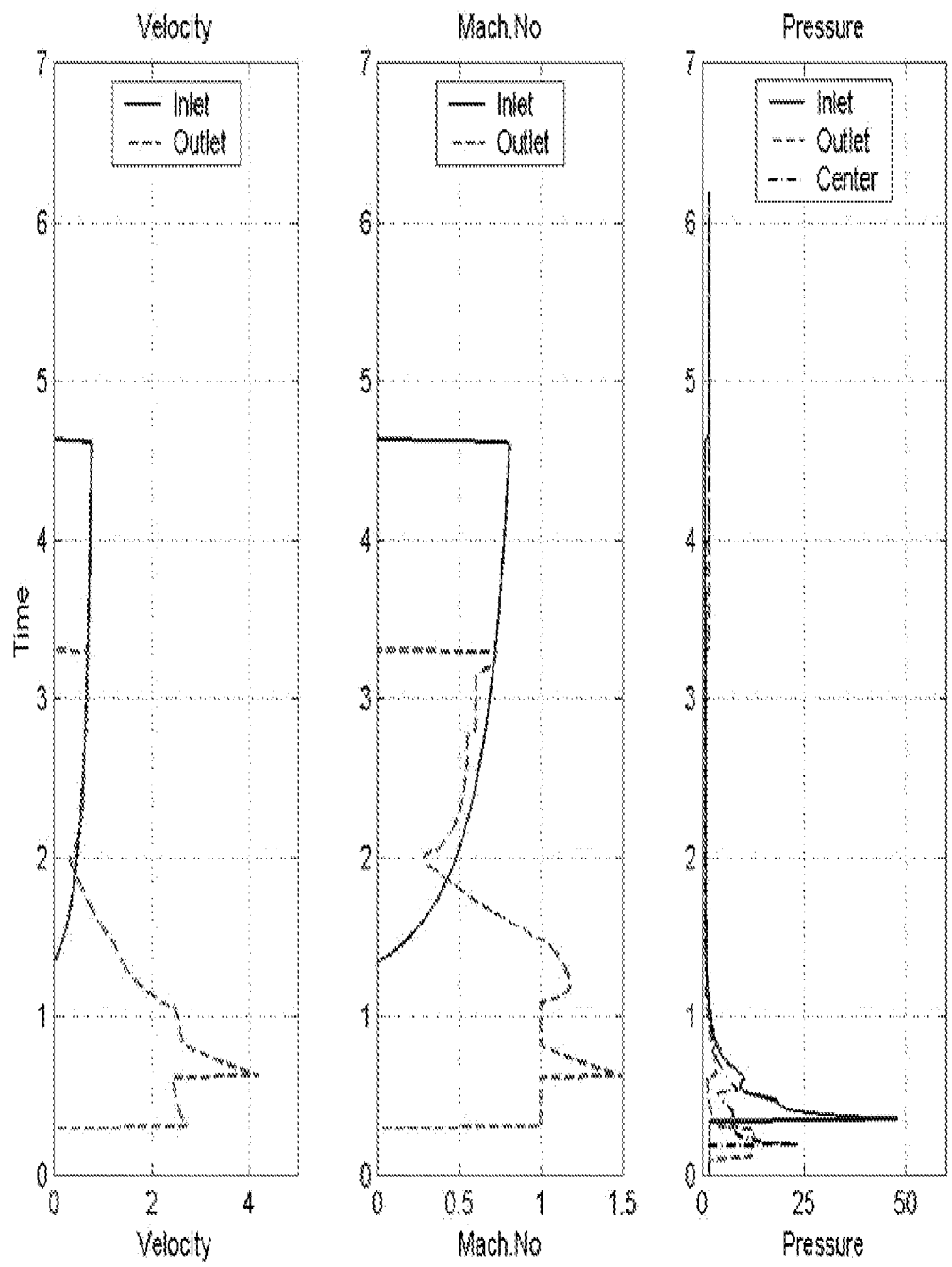
FIG. 9d is an inlet and exit flow profile showing velocity for the combustion processes of FIGS. 5, 6, and 7.
FIG. 9e is an inlet and exit flow profile showing Mach number for the combustion processes of FIGS. 5, 6, and 7.
FIG. 9f is an inlet and exit flow profile showing pressure for the combustion processes of FIGS. 5, 6, and 7.
Figures 10A, 10B, 10C, 10D:
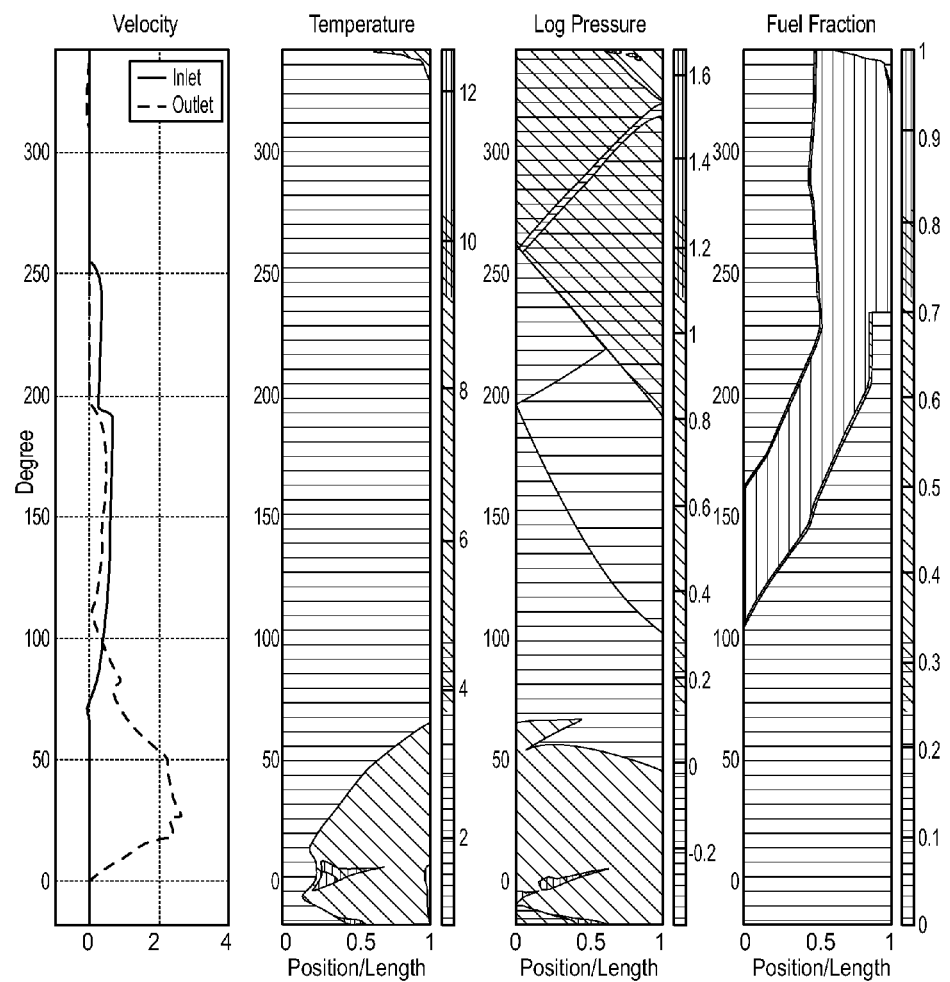
FIG. 10a is a wave diagram of velocity for backward-propagating combustion which includes a deflagration-to-detonation transition, according to one embodiment of the present invention.
FIG. 10b is a wave diagram of temperature for backward-propagating combustion which includes a deflagration-to-detonation transition, according to one embodiment of the present invention.
FIG. 10c is a wave diagram of pressure (logarithmic) for backward-propagating combustion which includes a deflagration-to-detonation transition, according to one embodiment of the present invention.
FIG. 10d is a wave diagram of fuel fraction for backward-propagating combustion which includes a deflagration-to-detonation transition, according to one embodiment of the present invention.
Figure 10E:
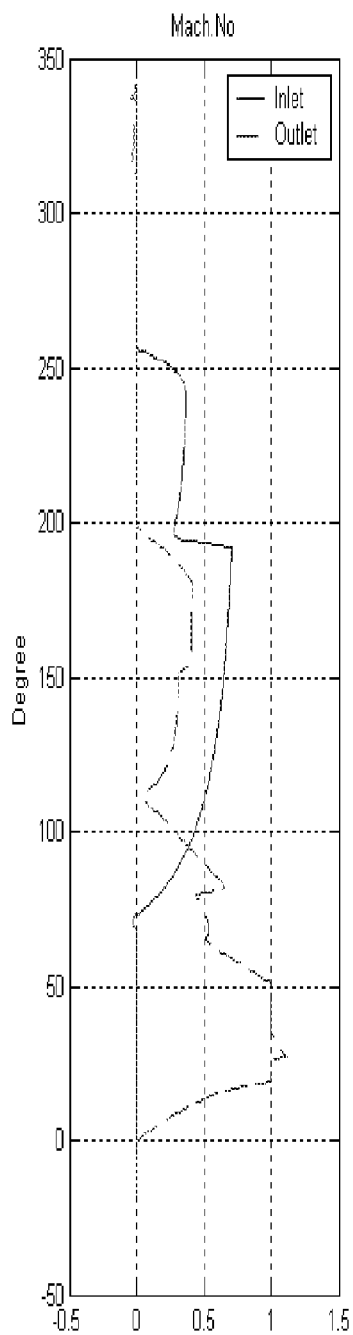
FIG. 10e is an inlet and exit flow profile of Mach number for backward-propagating combustion which includes a deflagration-to-detonation transition, according to one embodiment of the present invention.
Figure 10F:
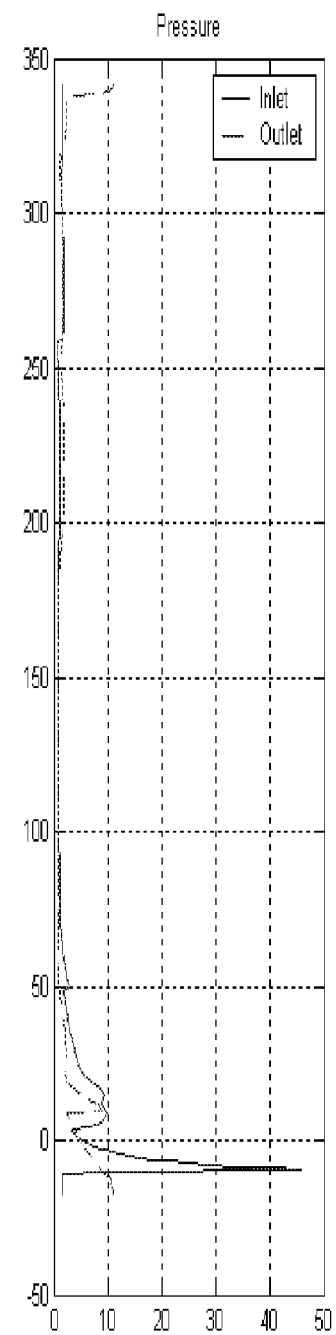
FIG. 10f is an inlet and exit flow profile of pressure for backward-propagating combustion which includes a deflagration-to-detonation transition, according to one embodiment of the present invention.
Figure 10G:
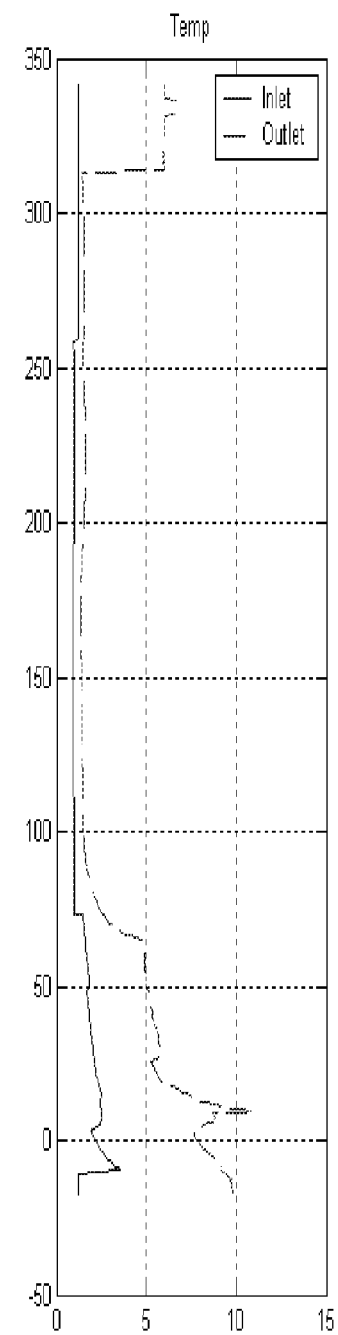
FIG. 10g is an inlet and exit flow profile of temperature for backward-propagating combustion which includes a deflagration-to-detonation transition, according to one embodiment of the present invention.

FIG. 8 presents variation in gas density of the working fluid as a function of time (vertical axis) and position (horizontal) in the channel frame of reference in a backward-propagating detonation configuration, for one converged cycle of wave rotor. The density values are nondimensionalized by the stagnation density of the inlet port and shown on a logarithmic scale to highlight wave strengths. Consistent with FIG. 6 discussed before, the ignition port now is placed at the bottom corner of the figure before opening the exhaust port. In wave rotor terminology, this method of presenting flow properties is called as the wave diagram which describes the rotor internal operation by tracing the trajectories of the waves and gas interfaces. The wave diagram is very useful for visualizing the wave process occurring inside the channels and also for explaining wave rotor design parameters, i.e., port opening and closing times and their locations. Hence, the color scheme represents lowest values in blue and highest in red.

The detonation trajectory can be faintly seen at the bottom right due to the relatively small change in density as a result of a nearly constant-volume combustion processes. However, once the detonation wave burns the combustible mixture in the right half-length of the channel, it encounters the unfueled region. This transmits the detonation into a shock wave propagating in the other half to the left end of channel until it hits the inlet wall. The trajectories of the backward-running shock wave and the reflected shock are clearly seen as read lines at the bottom left of the figure. Both detonation and shock waves greatly increase the pressure and temperature of the gas within the channel.

Upon opening of the exhaust port, strong expansion waves are created which travel along the channel to the left end allowing the burned gas to exit. The compressed air trapped in the left side of the channel also travels nearly the full length of the channel toward the exit port. This way, it acts as a buffer layer to prevent premature initiation of combustion during later filling process of the reactants (fuel and air) through the inlet port. The expansion waves reduce the pressure and temperature conditions in the channel which allows the introduction of the fresh air followed by the detonable mixture into the channel by opening the inlet port. In the above simulation, the inlet port consists of five sectors which are not shown in the figure. The fourth and fifth sectors in the inlet port are left unfueled to provide pure air so that approximately half of the channel to the right can be filled with the detonable mixture (air and fuel) and the other half to the left can be filled with air only. Therefore, by expelling the hot exhaust gas through the exhaust port, the detonable mixture arrives at the right end of the channel.

The exhaust port is closed when the exhaust velocity falls to a small value. The cooling of the surfaces is accomplished by delaying the closing of the exhaust port that the flow of lower temperature working fluid assists in cooling. However, if the closing of the exhaust port is further delayed, some amount of the detonable mixture can be lost to the exhaust. This would allow unreacted mixture to escape or spill. The closing of the exhaust port results the hammer shock, which compresses the freshly injected reactants admitted from the inlet port and the previously compressed air that remains within the channel as it travels to the left end. The trajectory of this shock is clearly seen in FIG. 8 where the density contour changes from dark to light green color. Further, the location where this shock wave contacts at the left wall defines the suitable time for the closure of the inlet port. The channel is brought to exactly the same state at which it began so that the cycle may repeat itself. Upon completion of the cycle, the total mass flow coming into the channel from inlet port should match the total mass flow going out of the channel from exhaust port. The balancing of the mass insures that the channel completes the cycle in nearly the same state at which it began.

Corresponding to FIG. 8, now FIGS. 9a to 9f describe wave diagrams with other major properties shown in non-dimensional form. Three contour plots on the top show pressure (in logarithmic scale), temperature, and fuel concentration, respectively, with the same color scheme discussed in FIG. 8. Velocity, Mach number, and pressure profiles in the inlet (blue line) and exit planes (red lines) are also shown on the bottom plots as functions of time and distance. Useful information about combustion and gas dynamic processes occurring inside the rotor channels can be obtained from these plots.

The temperature and pressure plots show a high-temperature high-pressure region after initiating the detonation wave at the bottom of the plots. Increase in pressure due to generation of the hammer shock is also seen in the pressure plot by changing the pressure colors from the blue to green. The temperature plot also indicates the inward movement of the contact interface between hot gas in the channels and fresh cold mixture received at the inlet port. The channel temperature reduces significantly when the burned gas leaves the channels and fresh cold gas mixture is entered through the inlet port. Fuel fraction plot indicates the inward movement of the fueled region (red) is stopped by closing of the exit end plate. The stopped detonable mixture seen as a column of red region remains adjacent to the exit wall until the beginning of the cycle and the ignition starts. This is due to the fact that the top of each wave diagram is considered to be looped around and joined to the bottom of the diagram. The fuel fraction contour also shows the detonation wave consumes the fuel rapidly at the bottom of the plot and becomes a shock wave where there is no fuel left. After the detonation wave becomes a shock wave, it reflects off the inlet wall as seen in the temperature and pressure contours.

While the inlet velocity profile shows a relatively uniform velocity profile, the exit velocity profile has a relatively non-uniform behavior with a peak that is due to the reflected shock wave. Compared with PDEs, still the exit flow is relatively uniform without any reverse flow. The broad exit Mach number range over the course of the cycle is noticeable. The Mach number profile shows the initially sonic exhaust flow becomes supersonic for a short period of time when the reflected shock wave exits the channels. It falls into sonic regime for some time again until the flow becomes briefly supersonic again when the hot exhaust is followed by the cold gas at comparable velocity. A peak pressure is observed in the inlet pressure profile after the backward-propagating shock wave impacts the inlet end plate. This may be of concern when considering structural loads.

The cycle of FIG. 9 does not consider the effect of deflagration-to-detonation transition (DDT). As a more realistic scenario, DDT is modeled based on a prescribed autoignition temperature in the code. Briefly, the combustion process is changed from turbulent deflagration to pure detonation when the cell temperature goes beyond a defined threshold (ignition) temperature. Obviously, such a simple model has little predictive value as DDT process is a much more complex process. However, within the constraints of a one-dimensional approach, there is not much scope for worthwhile modeling and multi-dimensional computations are needed for more accurate results.

To ensure ignition at vicinity of the outlet end wall, a pilot fuel injector is proposed injecting some additional fuel to the exit end of channels that are already contained premixed fuel/air. Such a rich fuel/air region can be rapidly combusted by the igniter or injected reacted gas. In the previous work, the ignitable mixture is brought near to the exit end wall by increasing the inlet pressure or alternatively lowering the backpressure. For instance, the ratio of the exhausts backpressure to the inlet stagnation pressure is set to 0.7 in the simulations shown in FIG. 9. This lowers the pressure again across the combustor. Additionally, as described before, the backpressure level has a strong influence on fuel positioning at the end of the cycle and wave processes occurring in the channels. Adding a pilot fuel injector does not necessitate positioning fuel adjacent to the end wall and less inlet pressure can push the detonable mixture towards the channel exit end.

Referring now to FIGS. 11, 12 and 13, some embodiments of the present invention include one or more fuel nozzles 90 for injection of fuel directly into a channel 82. Referring to FIG. 12, some embodiments include injection of fuel 92 into a channel 82 that is in fluid communication with inlet port 62.2 of stator 60, although in other embodiments fuel is injected after obstructing face 64 closes the first end of channel 82. Further, it is preferred but not necessary that the fuel be introduced after obstructing face 74 has substantially closed off the second end of channel 82. It is preferred but not necessary that fuel 92 be the same fuel used in nozzle 32 for creation of the combustible mixture. The present invention contemplate those embodiments in which fuel 92 is different than the predominant fuel burned in the combustor, such as those fuels 92 which are adapted for usage in the higher pressure and temperature environment of channel 82 (as compared to the lower pressure and lower temperature of air exiting from compressor 24).

Direct injection of a discrete quantity of fuel 92 into channel 82 creates a region 94 within the channel that has a generally higher fuel fraction than the fuel fraction of the combustible mixture available from port 66 of stator 60. As a result, this directly fueled region requires a smaller ignition energy than the ignition energy required by the combustible mixture. Preferably, the fuel nozzle 90 is stationary, and this directly fueled region is located proximate to the closed end 83.2 of the channel. However, the present invention also contemplates injection of fuel 92 anywhere along the length of channel 82 in which there is combustible mixture 84. Yet other embodiments, including those having stationary channels and movable obstructing faces or valve, contemplate coupling of the fuel nozzle 90 to the channel 82.

As the fueled channel 82 continues to rotate past stator 70, one or more igniters 96 ignite the local region of high fuel fraction. The combustion of this smaller region 94 subsequently ignites the combustible mixture 84. Referring to FIG. 13, there are several alternate circumferential locations for nozzle 90 and igniter 96.

It is recognized that the term discrete does not preclude mixing effects. As one example, it is appreciated that the discrete quantity of mixture 84 and the discrete quantity of fresh air 86 include a volume therebetween in which there is mixing of both quantities.

The results of the above modifications are illustrated in FIGS. 10a-10g which presents the wave diagrams (top) and flow states profiles at the inlet and exit planes (bottom). The vertical axes now represent the circumferential location of the channels in degree which is more meaningful in detailed designs of end walls. The white strips on the left side of the temperature plot represent the portion of the cycle over which the inlet and outlet ports are closed, as previously shown by blue shading in FIG. 8. The first black arrow on the top left side of the temperature plot represents location of the fuel pilot. The second and third black arrows are locations where deflagration and detonation initiators are positioned in the code, respectively, to model DDT process in the code. Now, comparing with FIG. 9, the detonation initiator is placed at the end of the cycle just before starting a new cycle due to different port timings of the modified cycle. In real experiments, a single igniter or several sequential igniters may be needed to initiate and maintain combustion process.

In the simulations the ratio of the exhausts backpressure to the inlet stagnation pressure is increased to 0.9, therefore, the detonable mixture is not fully reached to the exit end wall. However, an additional fueled region provided by the pilot fuel filled the right end side of the channel. A tiny dark boundary separating these two regions can be seen in the fuel plot. The effect of DDT process can be seen from the fuel fraction plot where the fuel burning rate reduces from the deflagration region to the detonation region.

FIGS. 11, 12 and 13 illustrates the frontal, center, and rear sections, respectively, of assembly 50. The size and location of the inlet and exit ports are calculated based on the described numerical simulation. Only 40% of the inlet port is supplied with the combustible mixture and a few first and last sectors of the port are left unfueled to provide pure air to the channels. In addition to the pilot fuel and deflagration initiator positions shown in the exit end wall, other possible positions are suggested which could lead to different wave diagrams not presented in this article. The most suitable positions for the studied configuration can be determined from the experimental tests.

FIGS. 5, 11, 12, and 13 depict yet another embodiment of the present invention pertaining to a control system for a wave rotor or a pulse detonation engine. In one embodiment, the control system includes an electronic controller 100, one or more position sensors 102, one or more combustion state sensors 104, an operable connection from controller 100 to sensors 102 and 104, as well as actuatable connections to fuel nozzle 90 and ignition source 96. Dotted lines in theses figures indicate operable connections between controller 100 and the various components.

In one embodiment, a position sensor 102 (such as a resolver or Hall-effect sensor) is coupled to either inlet stator 60 or outlet stator 70. Sensor 102 produces a signal which corresponds to the relative positions of that stator relative to rotor 80. In one embodiment, sensor 102 is coupled to inlet stator 60 so as to benefit from the cooler conditions of stator 60 relative to stator 70. Sensor 104 is applicable to those embodiments of the present invention which do not include a rotating element, such as, as one example only, a single tube PDE. Combustion state sensor 104 can be any type of sensor which transduces one of the combustion events into a signal (such as optical or electrical signals). In one embodiment, combustion state sensor 104 is a piezoelectric pressure sensor coupled to a portion of the pulse detonation engine which undergoes a change in strain during the combustion occurring shortly after ignition. Yet other embodiments of the present invention, with either wave rotors, multiple tube PDEs, or single tube PDEs, can include one or more other types of combustion state sensors, including infrared pyrometers, thermocouples, or the like. It is recognized that the sensors should be designed for the temperature and vibration expected in the environment of the wave rotor or PDE.

The control system further includes the electromechanical mechanism which facilitates the actuation of fuel nozzle 90 to inject a discrete quantity of fuel upon receipt of an actuating command from controller 100.

Controller 100 can be of any type which can accept signals from sensors 102 and/or 104, accept signals from the operator of engine 20, and actuate fuel nozzle 90 to inject a discrete quantity of fuel. In some embodiments, electronic controller 100 is a digital controller which includes software that manipulates the sensor signals and other input commands, and generates an output signal or command to igniter 96 and/or fuel nozzle 90. However, the present invention also contemplates those embodiments in which there is a different type of controller, including, by way of example, a pneumatic controller or electropneumatic controller. Further, in some embodiments, controller 100 could be a hydromechanical controller which receives a mechanical input (such as by gearing) that relates the rotational position of the wave rotor relative to the hydromechanical controller.

In one embodiment, the control system injects a predetermined quantity of fuel. As the wave rotor 80 rotates to a position such as positions VI, I, or Ii (referring to FIG. 6). At the appropriate predetermined rotational position, controller 100 operates nozzle 90 to inject a predetermined quantity of fuel into combustible mixture 84. At this same moment or after a predetermined delay, controller 100 may also actuate igniter 96 to produce a spark and ignite the directly injected fuel.

FIGS. 15, 16, 17a, 17b, 18, and 19 are schematic representations of portions of wave rotors according to other embodiments of the present invention. These embodiments provide for increased reliability of the ignition process using a precombustion chamber (PCC) placed either in the rotor, in a stationary end plate of the wave rotor device, or both. With reference to FIGS. 15-19, the use of a hundred-series prefix in front of an element number (NXX), refers to an element that is the same as the non-prefixed element (XX), except for the changes shown and described.

Figure 15:
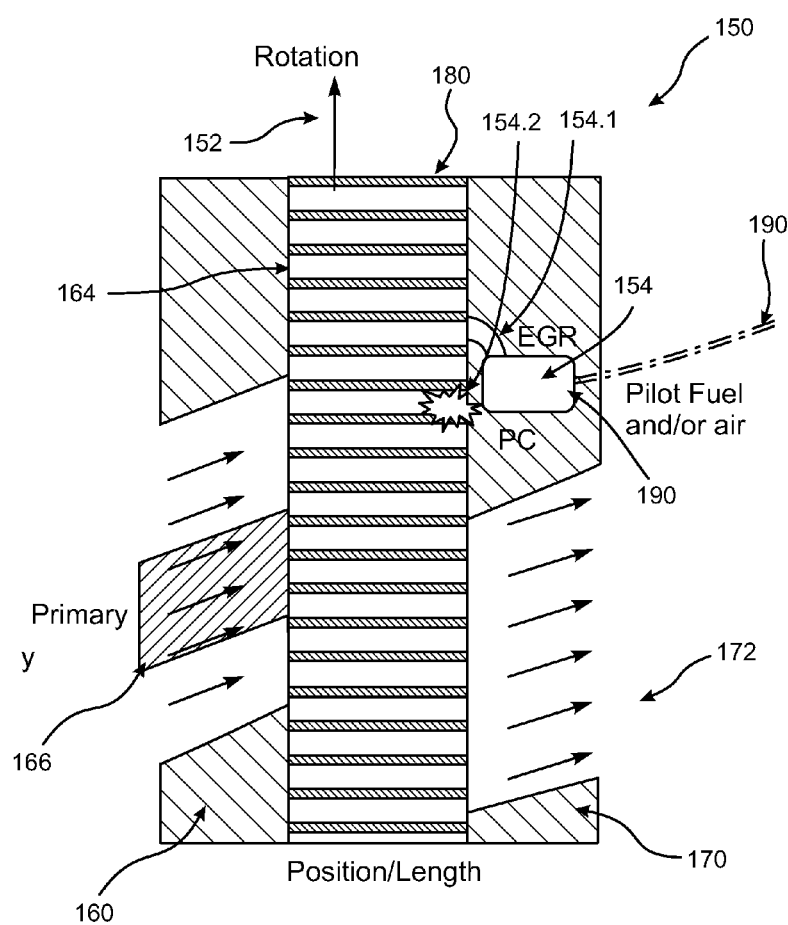
FIG. 15 is a schematic representation of a wave rotor in a developed (unwrapped) view according to another embodiment of the present invention.

Referring to FIG. 15, in one embodiment there is a wave rotor assembly 150 having a precombustion chamber 154. PCC 154 is a small continuous flow reactor incorporated into the stationary end wall 170 of the wave rotor 180. Preferably, PCC 154 is a separate chamber partitioned away from the flow channels 182 by a portion of end wall 170. PCC 154 is supplied with a small flow of pilot fuel from a pilot fuel nozzle 190 (not shown) and small quantities of uncombusted air, and/or recirculated exhaust gas. In yet some embodiments PCC 154 is provided with uncombusted air. As one example, PCC 154 can be provided with air from the compressor of the engine.

In yet other embodiments the pilot fuel combusts with the unburned portion of the recirculated exhaust gas. The hot recirculated exhaust gas (EGR) causes the fuel to be chemically decomposed and form a pressurized hot reactive mixture of gases, plasmas, and chemically active radicals. Meanwhile the rotating channels 182 of the wave rotor 180 are supplied with a primary fuel-air mixture 184. The reactive mixture within PCC 154 is injected as a torch from the PCC into the rotating channels 182 as they sequentially come into alignment with the PCC. PCC 154 thus serves as a single source of ignition for the many channels 182 of the rotor 180.

Figure 16:
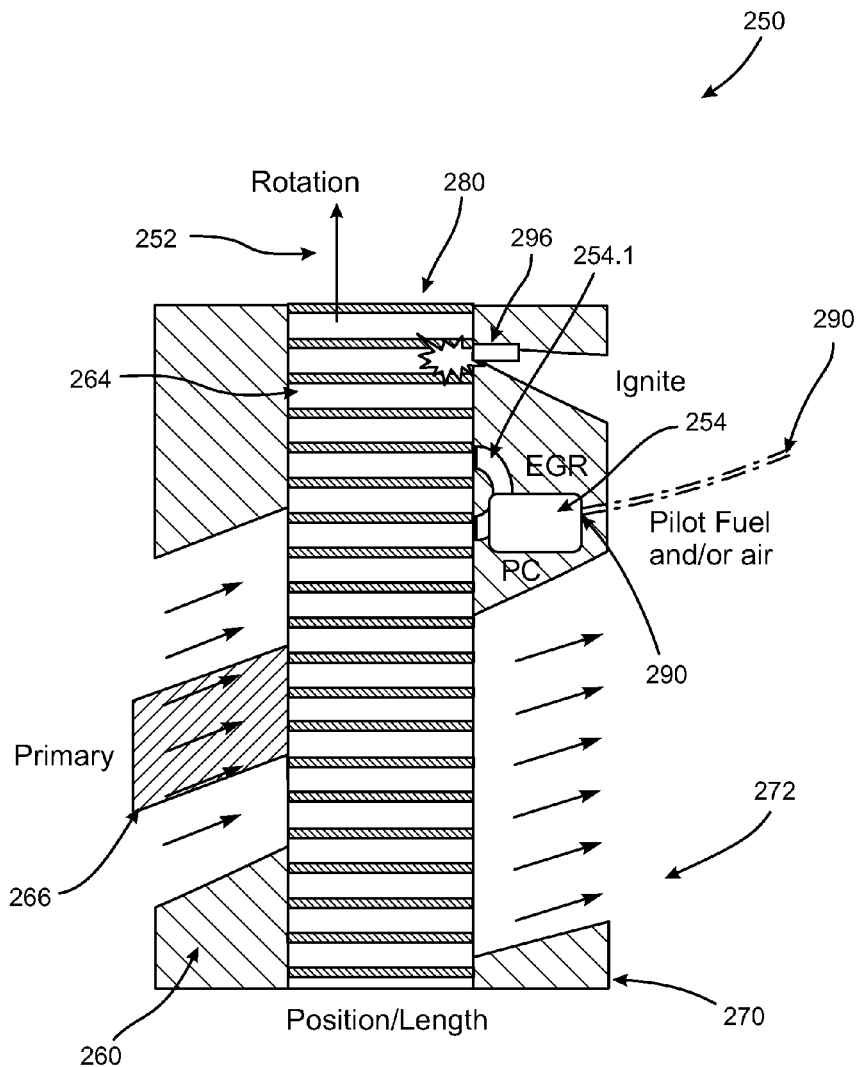
FIG. 16 is a schematic representation of a wave rotor in a developed (unwrapped) view according to another embodiment of the present invention.

Referring to FIG. 16, in a yet another embodiment of the invention there is a rotor assembly 250 in which PCC 254 is located in the stationary end wall 270. PCC 254 injects partially reacted pilot fuel at moderate temperature, and an adjacent supply of hot ignition gas or other method of ignition is provided to ensure ignition of the mixture in the rotating channel 282. In one embodiment an igniter 296 is located in a rotational position after the injection of the pilot fuel.

Figure 17A:
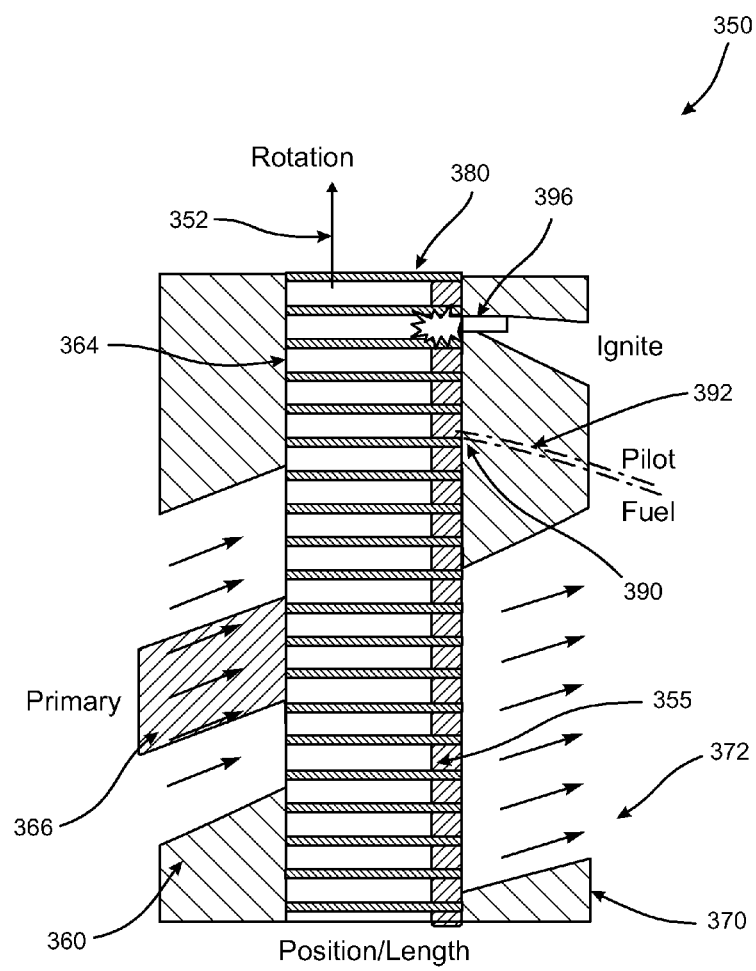
FIG. 17a is a schematic representation of a wave rotor in a developed (unwrapped) view according to another embodiment of the present invention.
Figure 17B:
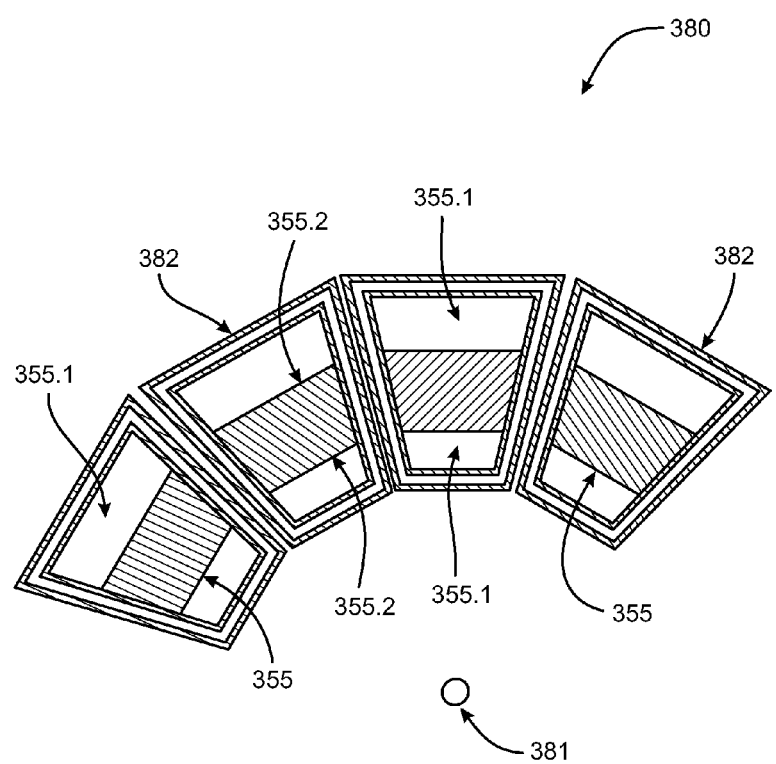

Referring FIG. 17a and 17b, in yet another embodiment of the invention there is a rotor assembly 350 in which each rotating channel 382 includes a precombustion chamber 355. Each rotating PCC 355 is separated by one or more partitions 355.2 in the rotating channel 382. FIG. 17b is an end view of a portion of the exhaust end of rotor 380. FIG. 17b shows four channels 382 of rotor 380. Each channel 382 includes one or more interior walls 355.2 that form a rotating precombustion chamber 355. In the embodiment shown in FIG. 17b, the primary flowpath 355.1 of the respective channel 382 extends longitudinally on either side of precombustion chamber 355. Precombustion chambers 355 are shown in cross hatch in FIG. 17b. Referring again to FIG. 17a, each rotating precombustion chamber 355 is preferably placed in the exhaust end of the respective channel 382 and extends longitudinally for less than half of the length of channel 382.

PCC 355 is initially filled with air or with primary fuel air mixture, which may not be easily ignitable. Pilot fuel is then injected into precombustion chamber 355 from nozzles 390 on the stationary end plate 370. The pilot fuel forms an enriched mixture, which is then easily ignited by the ignition gas, electric spark, laser pulse, plasma gas, or other method of ignition. In one embodiment, an igniter 396 is provided as part of stator 370

Figure 18:
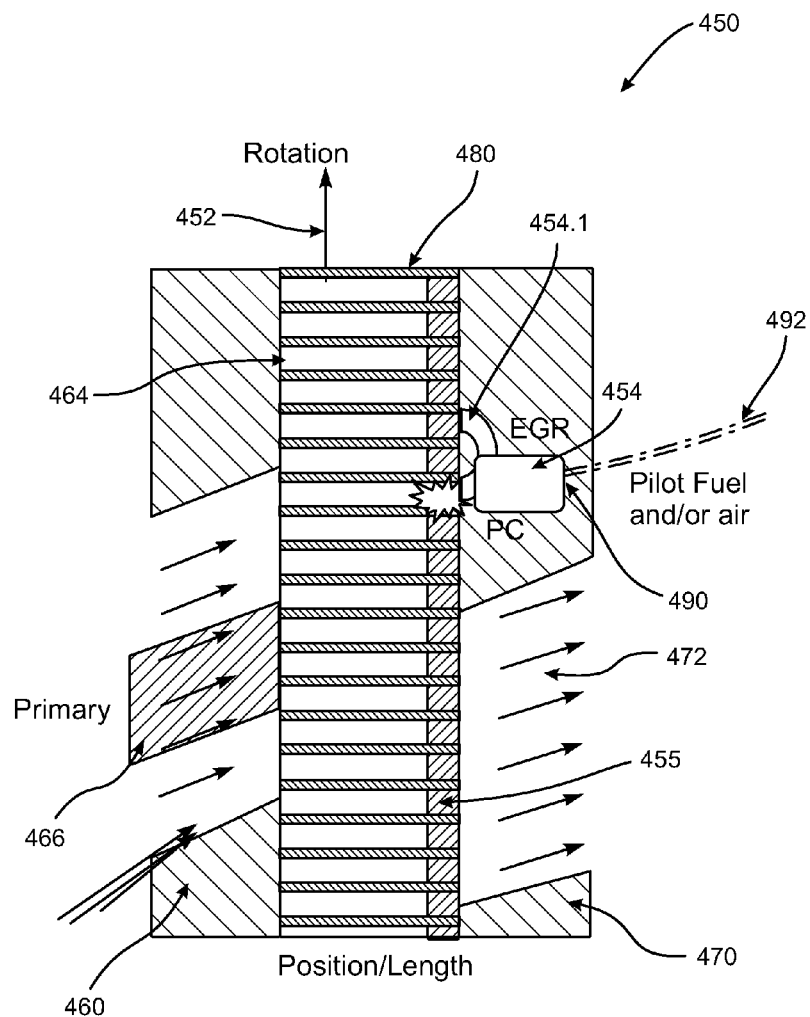
FIG. 18 is a schematic representation of a wave rotor in a developed (unwrapped) view according to another embodiment of the present invention.

Referring to FIG. 18, in yet another embodiment of the invention there is a rotor assembly 450 in which each rotating channel 482 has its own precombustion chamber 455 fashioned using partitions 455.2 in the rotating channel similar to PCC 355 of FIGS. 17a and 17b. This PCC 455 partition is initially filled with air or with primary fuel-air mixture, which may not be easily ignitable. In addition, a stationary PCC 454 in the end-wall 470 similar to PCC 154 provides partially-reacted fuel or hot plasma injected into the rotating PCC.

Figure 19:
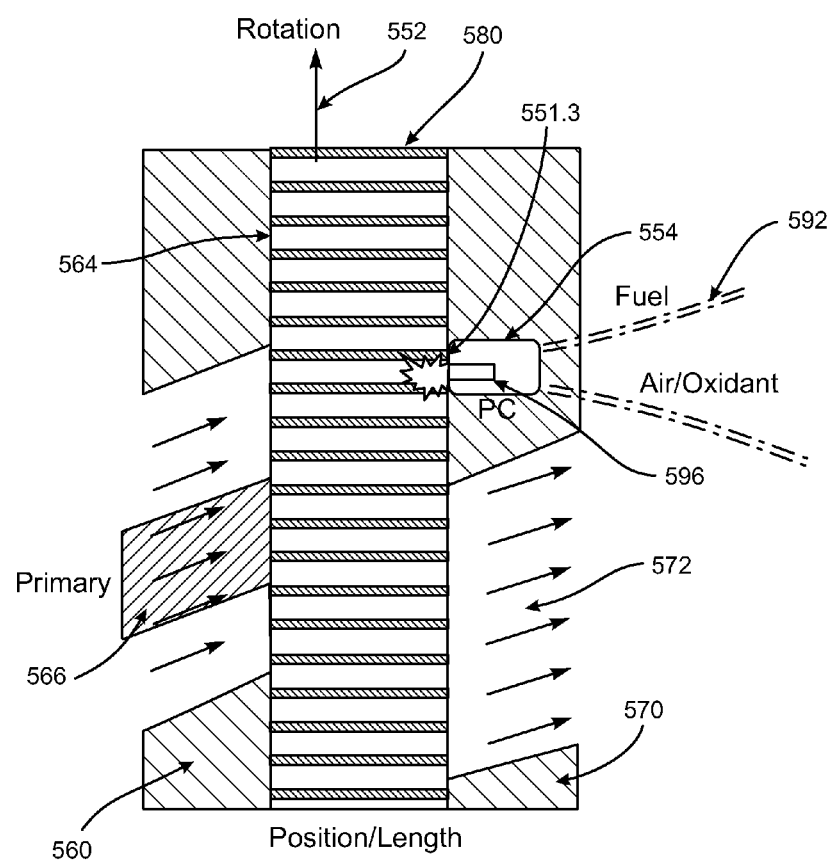
FIG. 19 is a schematic representation of a wave rotor in a developed (unwrapped) view according to another embodiment of the present invention.

FIG. 19 shows yet another embodiment of the present invention in which there is a rotor assembly 550 having a precombustion chamber 554 that ignites the mixture within a channel 582. In one embodiment, PCC 554 is a stationary chamber preferably attached to stator 570. PCC 554 preferably includes a single port 554.1 that is in fluid communication with a channel 582.

In some embodiments, there is at least a single partition wall 551.3 that defines port 554.1 and separates channel 582 from the interior of PCC 554. PCC 554 is provided with fuel 592 sprayed through a nozzle 590 into the chamber. The chamber 554 is further provided with air from the engine's compressor or another source of oxidant for the fuel. The pilot fuel and the air or oxidant mix within chamber 554 to form an ignitable mixture. Preferably, an igniter 596 provides a spark or other source of ignition to the pilot mixture, such that a torch of combusted gases exits PCC 554 through the port 554.1 and into a corresponding channel 582 that has rotated into fluid communication with port 554.1.

While the inventions have been illustrated and described in detail in the drawings and foregoing description, the same is to be considered as illustrative and not restrictive in character, it being understood that only several embodiments have been shown and described and that all changes and modifications that come within the spirit of the invention are desired to be protected.

What is claimed is:

1. A combustor, comprising:
   a first fuel nozzle for spraying fuel to create a mixture of fuel and oxidizer for combustion;
   a rotor having two ends and defining a plurality of enclosed channels, each said channel being adapted and configured to support combustion therein and having a first port at the first end of said rotor and a second port at the second end of said rotor, said rotor being rotatable about an axis;
   a first stator proximate to the first end of said rotor, said first stator including at least one inlet adapted and configured to provide flow of the mixture into the first port of a corresponding said channel as said first port rotates into flow communication with said inlet;
   a second stator proximate to the second end of said rotor, said first stator including at least one outlet adapted and configured to receive flow of combusted mixture from a second port of a corresponding said channel as said second port rotates into flow communication with said outlet; and
   a second fuel nozzle for introducing fuel into at least one said channel intermediate of the first port and the second port.

2. The combustor of claim 1 wherein combustion of the fuel from said fuel nozzle results in a backward-propagating detonation cycle within the corresponding channel.

3. The combustor of claim 1 wherein said fuel nozzle is placed proximate to the second port, and which further comprises means for igniting the fuel from said fuel nozzle.

4. The combustor of claim 1 wherein said first stator includes at least two said inlets, each said inlet being spaced apart from each other so as to align with respective spaced apart channels of said rotor.

5. The combustor of claim 4 wherein said inlets are equally spaced about the circumference of said rotor.

6. The combustor of claim 1 wherein said second stator includes at least two said outlets, each said outlets being spaced apart from each other so as to align with respective circumferentially spaced apart channels of said rotor.

7. The combustor of claim 6 wherein said outlets are equally spaced about the circumference of said rotor.

8. The combustor of claim 1 which further comprises a plurality of fuel nozzles, each said fuel nozzle introducing fuel into a different one of said channels intermediate of the first port and the second port of the respective channel.

9. The combustor of claim 8 which further comprises a plurality of stationary igniters, each said igniter being circumferentially spaced between adjacent fuel nozzles.

10. The combustor of claim 1 which further comprises an igniter for igniting fuel introduced from said fuel nozzle.

11. The combustor of claim 10 wherein said igniter is coupled to said second stator and in electrical communication with the second port of a corresponding channel as said rotor rotates, wherein ignition of the fuel results in a backward-propagating detonation cycle within the corresponding channel.

12. The combustor of claim 6 which further comprises a plurality of fuel nozzles, each said fuel nozzle introducing fuel into one of said channels intermediate of the first port and the second port of the respective channel.

13. The combustor of claim 1 wherein combustion of fuel from said fuel nozzle results in a forward-propagating detonation cycle within the corresponding channel.

14. A combustor for com busting a mixture of fuel and air, comprising:
   a rotor having two ends and defining a plurality of enclosed channels, each said channel being adapted and configured to support combustion therein and having a first port at the first end of said rotor and a second port at the second end of said rotor, said rotor being rotatable about an axis;
   a first stator proximate to the first end of said rotor, said first stator including at least one inlet adapted and configured to provide flow of the uncombusted mixture into the first port of a corresponding said channel as said first port rotates into flow communication with said inlet;
   a second stator proximate to the second end of said rotor, said first stator including at least one outlet adapted and configured to receive flow of combusted mixture from a second port of a corresponding said channel as said second port rotates into flow communication with said outlet;
   a precombustion chamber in fluid communication with the second port of at least one of said channels, said precombustion chamber having at least one partition separating at least a portion of said precombustion chamber from at least a portion of the one said channel; and wherein combustion in said precombustion chamber ignites the mixture in the one said channel.

15. The combustor of claim 14 wherein said precombustion chamber is attached to said second stator.

16. The combustor of claim 15 wherein said precombustion chamber includes an inlet receiving gas from a second port of a different one of said channels and an outlet providing gas to the second port of the one said channel.

17. The combustor of claim 14 which further comprises a plurality of precombustion chambers, each said precombustion chamber being located within a corresponding one of said channels.

18. The combustor of claim 14 which further comprises a fuel nozzle for introducing fuel into said precombustion chamber.

* * * * *